United States Patent
Scruggs et al.

(10) Patent No.: US 12,174,050 B1
(45) Date of Patent: Dec. 24, 2024

(54) HIGH SENSITIVITY ULTRASONIC FLOW METER

(71) Applicant: SENTINEL HYDROSOLUTIONS, LLC, Escondido, CA (US)

(72) Inventors: Sean Scruggs, San Diego, CA (US); Jonathan Naveh, San Diego, CA (US)

(73) Assignee: Sentinel Hydrosolutions, LLC, Escondido, CA (US)

( * ) Notice: Subject to any disclaimer, the term of this patent is extended or adjusted under 35 U.S.C. 154(b) by 0 days.

(21) Appl. No.: 17/741,405

(22) Filed: May 10, 2022

Related U.S. Application Data

(60) Provisional application No. 63/186,789, filed on May 10, 2021.

(51) Int. Cl.
*G01F 1/667* (2022.01)
*G01F 25/10* (2022.01)

(52) U.S. Cl.
CPC ............ *G01F 1/667* (2013.01); *G01F 25/10* (2022.01)

(58) Field of Classification Search
CPC ................................ G01F 1/667; G01F 25/10
See application file for complete search history.

(56) References Cited

U.S. PATENT DOCUMENTS

| | | |
|---|---|---|
| 3,874,222 A | 4/1975 | Ladd et al. |
| 4,336,708 A | 6/1982 | Hobgood et al. |
| 4,450,719 A | 5/1984 | Nishimura et al. |
| 4,518,955 A | 5/1985 | Meyer |
| 4,529,974 A | 7/1985 | Tanaka et al. |
| 5,228,329 A | 7/1993 | Dennison |
| 5,373,737 A | 12/1994 | Hwang |
| 5,461,910 A | 10/1995 | Hodson et al. |
| 5,637,789 A | 6/1997 | Lawson |
| 5,764,539 A | 6/1998 | Rani |
| 5,856,622 A * | 1/1999 | Yamamoto .............. G01F 1/668 73/861.28 |
| 6,147,613 A | 11/2000 | Doumit et al. |
| 6,310,555 B1 | 10/2001 | Stern et al. |

(Continued)

FOREIGN PATENT DOCUMENTS

| | | | |
|---|---|---|---|
| CN | 103364661 A | * 10/2013 | |
| CN | 112097843 A | * 12/2020 | ............... G01F 1/66 |

(Continued)

*Primary Examiner* — Tarun Sinha
*Assistant Examiner* — Drexel Alejandro Venero
(74) *Attorney, Agent, or Firm* — Gary I. Eastman, Esq.; Eastman IP

(57) ABSTRACT

Methods for Ultrasonic Flow Metering, Ultrasonic Flow Meter Calibration, and Ultrasonic Fluid Characterization. Focusing on the governing principles and equations of flow measurement for ultrasonic flow meters, using temperature referenced differential and absolute time of flight measurements to characterize fluid motion. As well as, experimental solutions to meter calibration constants, thermal expansion, concentration change in fluid validation/correction using a ratiometric approach comparing expected and measured zero flow measurements, change of fluid in process validation/correction using acoustic properties of a specific fluid, and zero flow correlations/validation based on time of flight and temperature, referenced to historically captured data and the acoustic properties of the fluid in the process.

18 Claims, 31 Drawing Sheets

Figure 1: Transducer mounting configurations

(56) References Cited

U.S. PATENT DOCUMENTS

| | | | |
|---|---|---|---|
| 6,370,950 B1 | 4/2002 | Lammerink | |
| 6,474,132 B1 * | 11/2002 | Hathaway | G01F 1/08 |
| | | | 702/100 |
| 6,481,265 B1 | 11/2002 | Weber et al. | |
| 6,804,990 B2 | 10/2004 | Weber et al. | |
| 7,054,767 B2 | 5/2006 | Eldrige | |
| 7,308,824 B2 | 12/2007 | Trescott et al. | |
| 7,565,836 B2 | 11/2009 | Kanke | |
| 2003/0234872 A1 * | 12/2003 | Matherson | H04N 25/61 |
| | | | 348/222.1 |
| 2004/0225458 A1 | 11/2004 | Sherikar | |
| 2010/0170335 A1 | 7/2010 | Nakano et al. | |
| 2010/0305465 A1 | 12/2010 | Ricks et al. | |
| 2012/0125124 A1 * | 5/2012 | Hays | G01F 15/024 |
| | | | 73/861.357 |
| 2017/0296727 A1 * | 10/2017 | Burbank | A61M 1/341 |
| 2018/0023989 A1 * | 1/2018 | Droin | G01N 29/024 |
| | | | 73/861.04 |
| 2018/0106650 A1 * | 4/2018 | Pedersen | G01F 1/662 |
| 2020/0056915 A1 * | 2/2020 | Pamakstis | G01F 1/667 |

FOREIGN PATENT DOCUMENTS

| | | | | |
|---|---|---|---|---|
| JP | 2005188974 A * | 7/2005 | | G01F 1/66 |
| WO | WO 03064981 A1 * | 8/2003 | | G01F 1/66 |

* cited by examiner

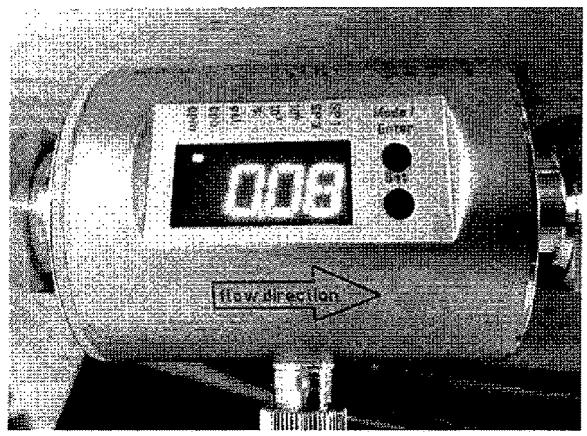
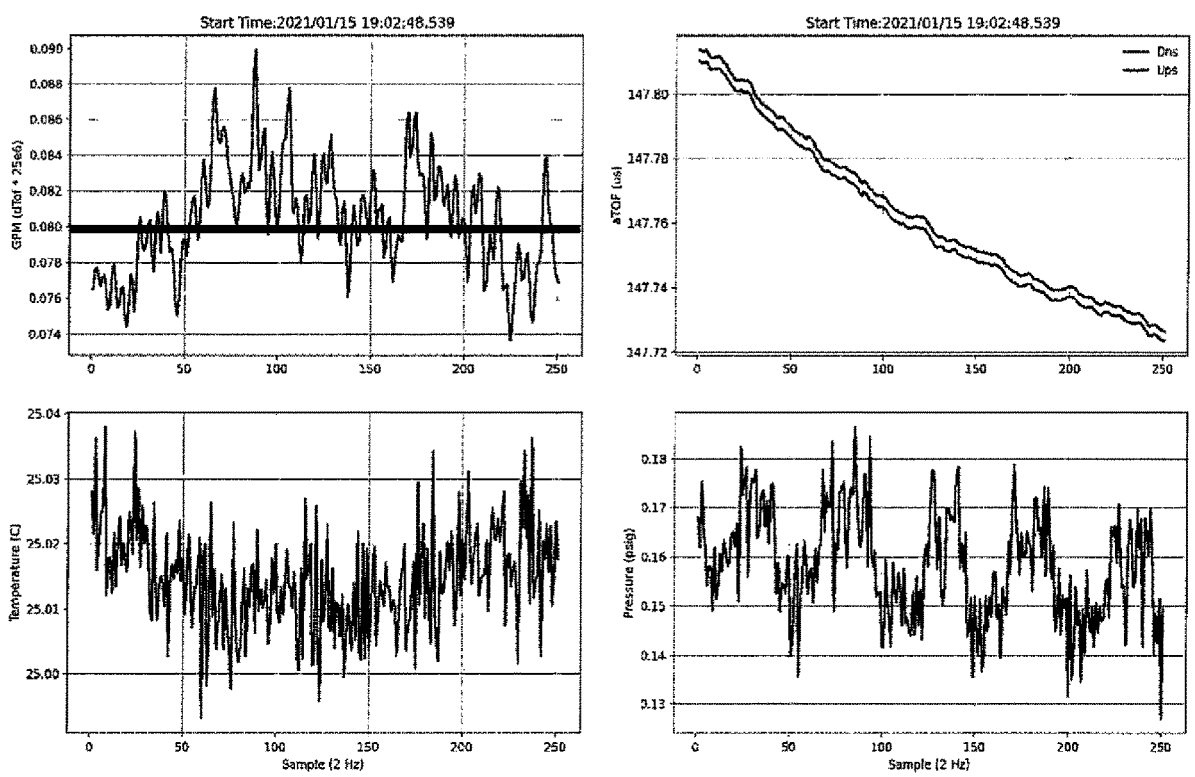
FIG. 5

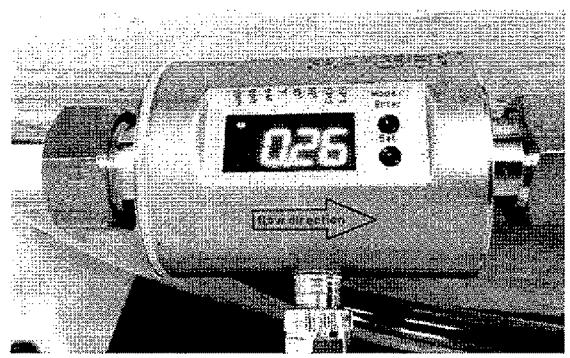
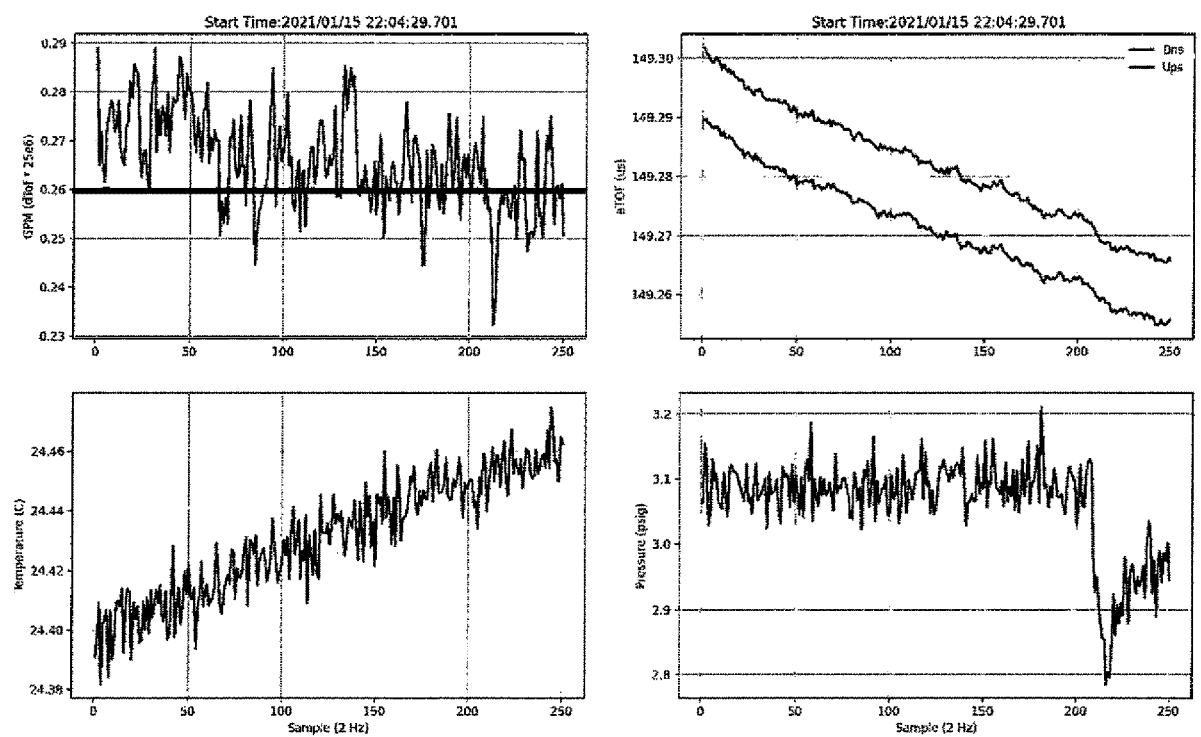
FIG. 6

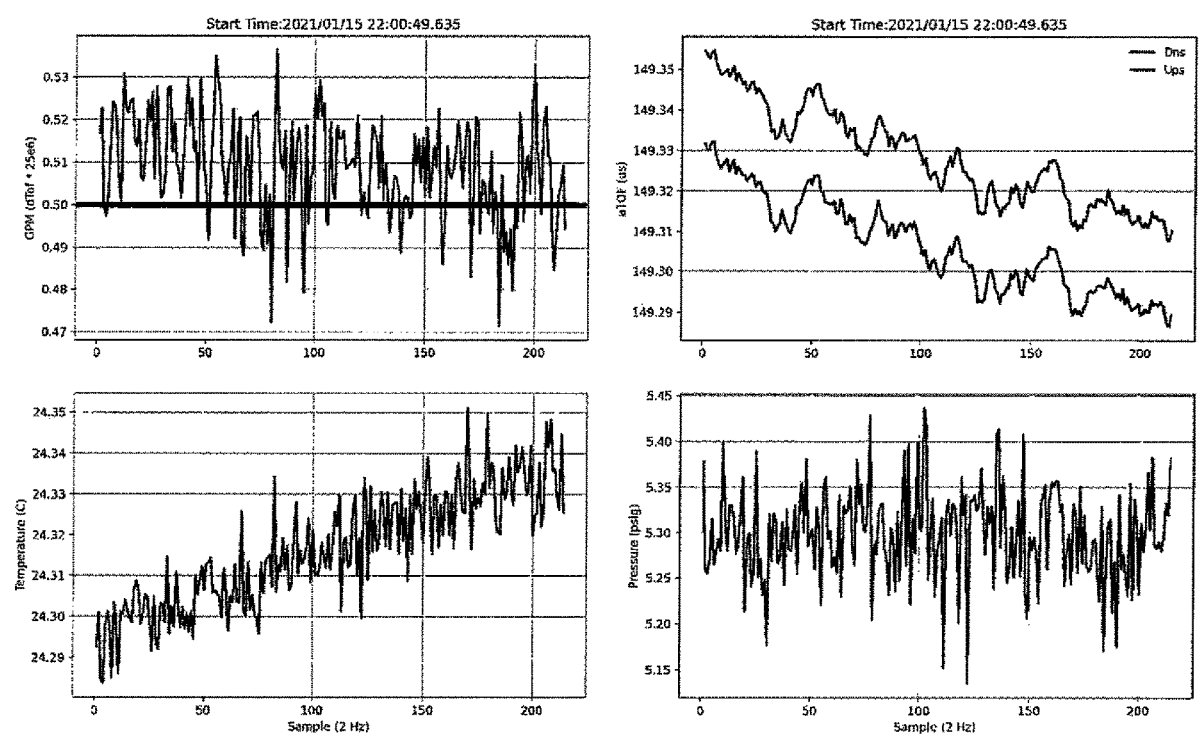
FIG. 7

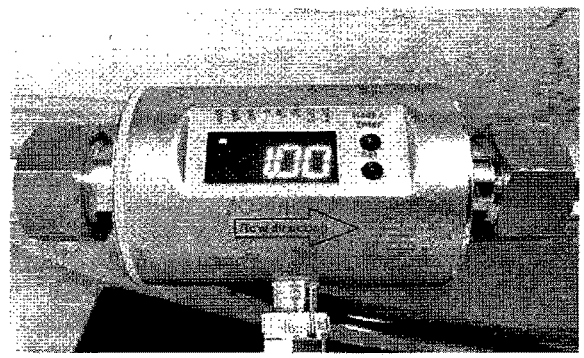
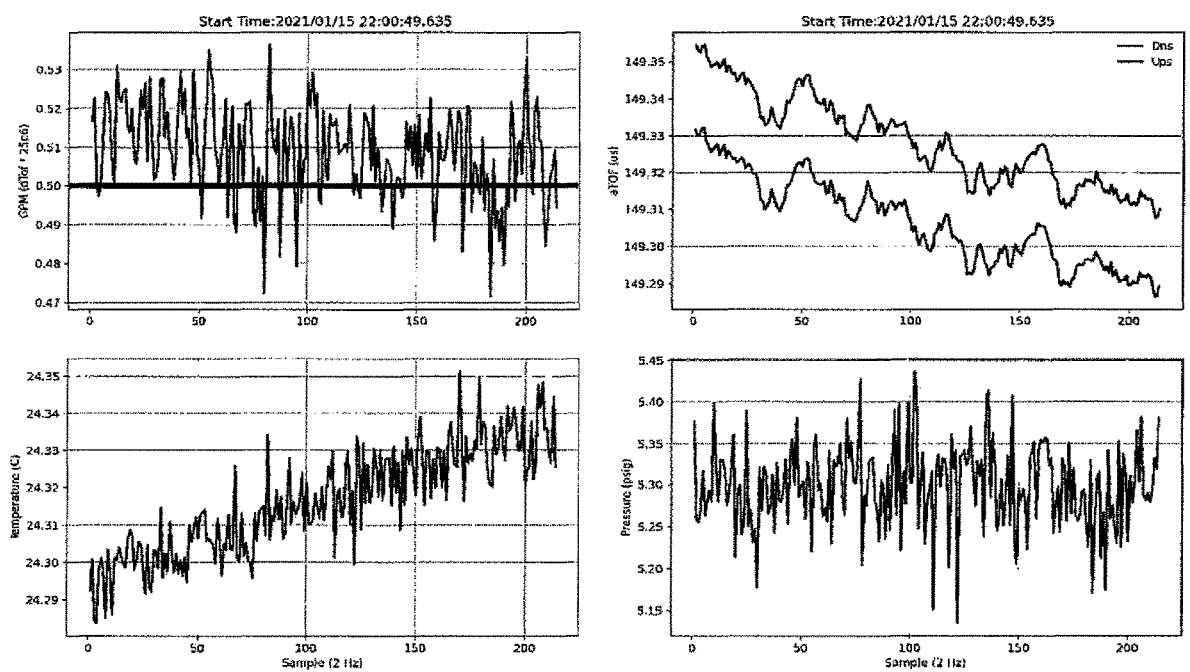
FIG. 8

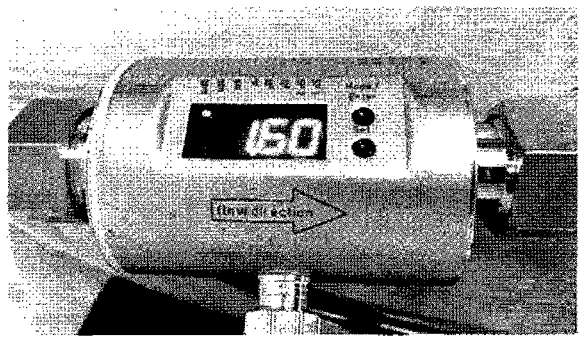
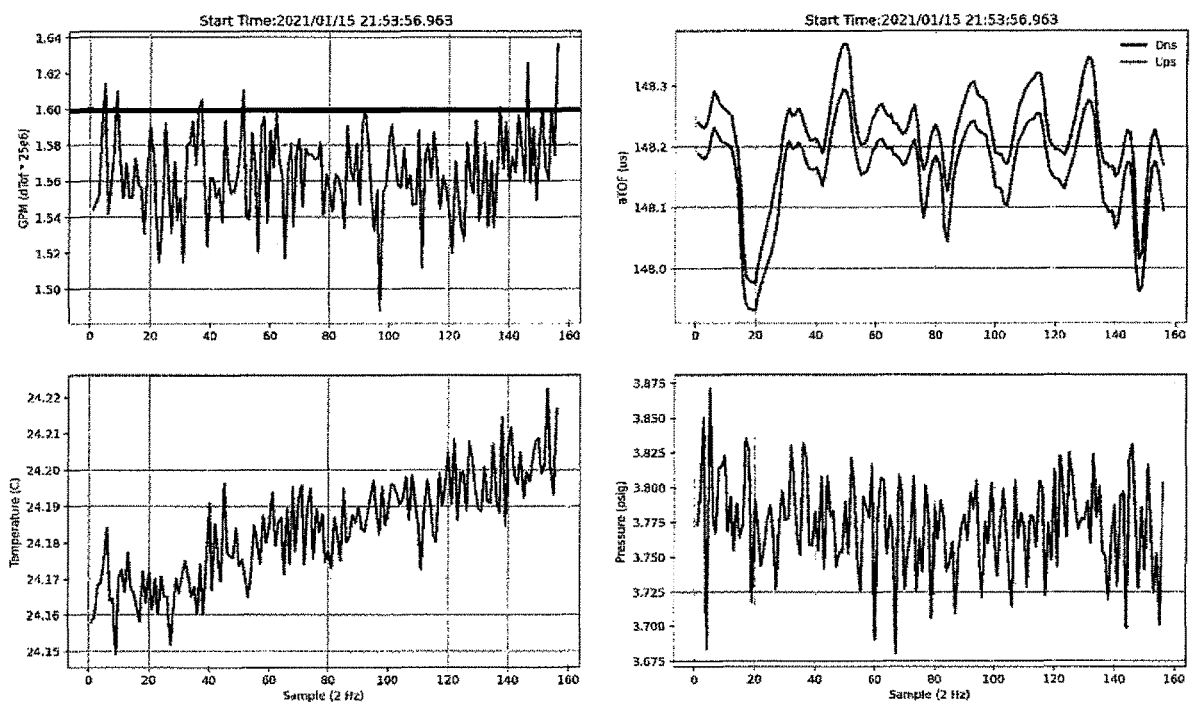
FIG. 9

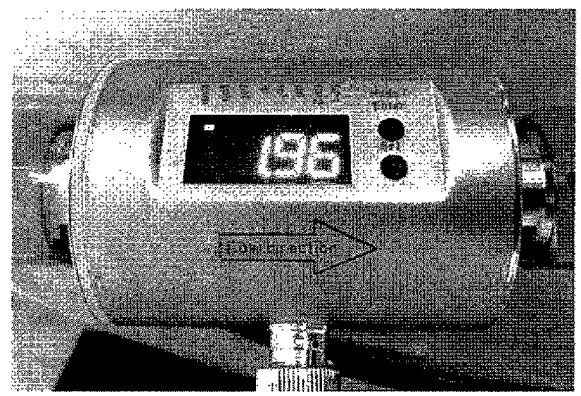
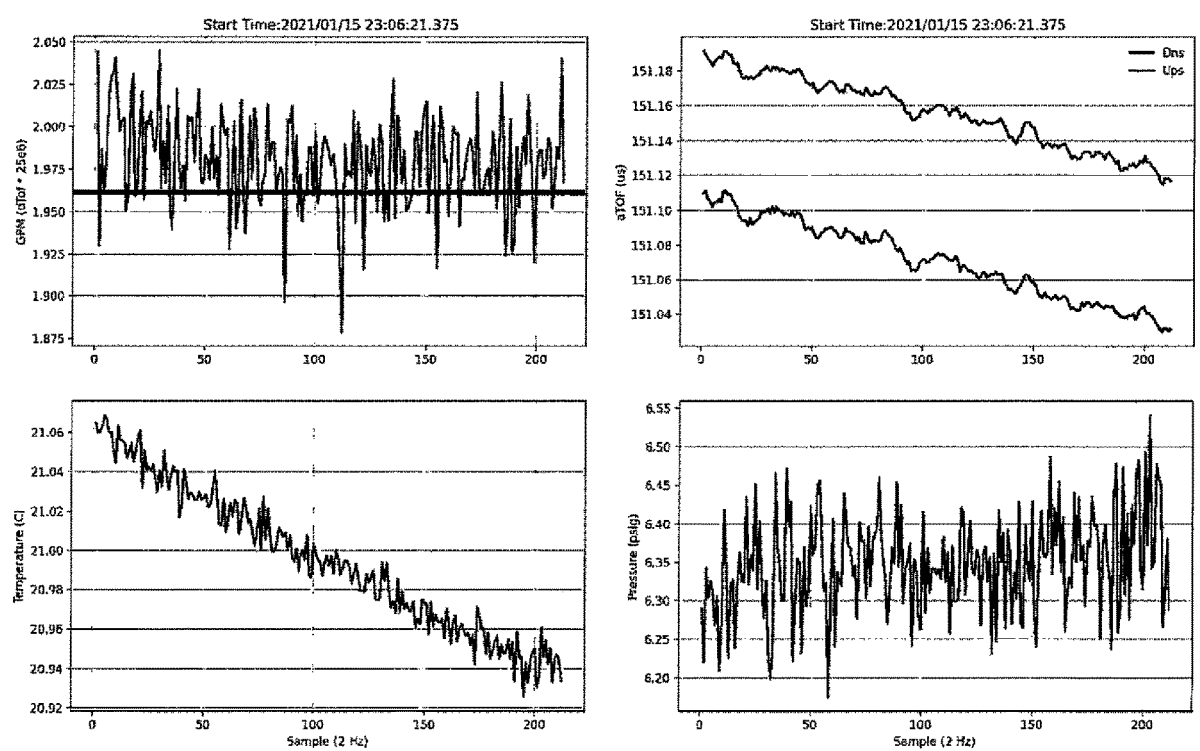
FIG. 10

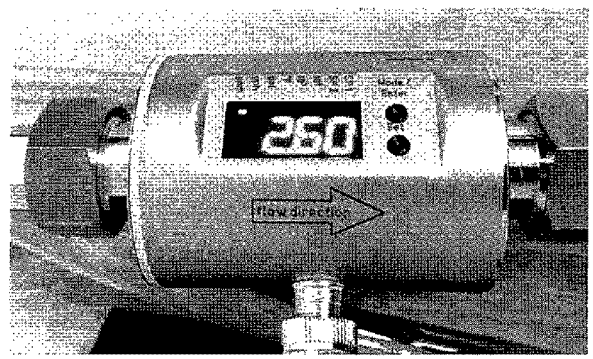
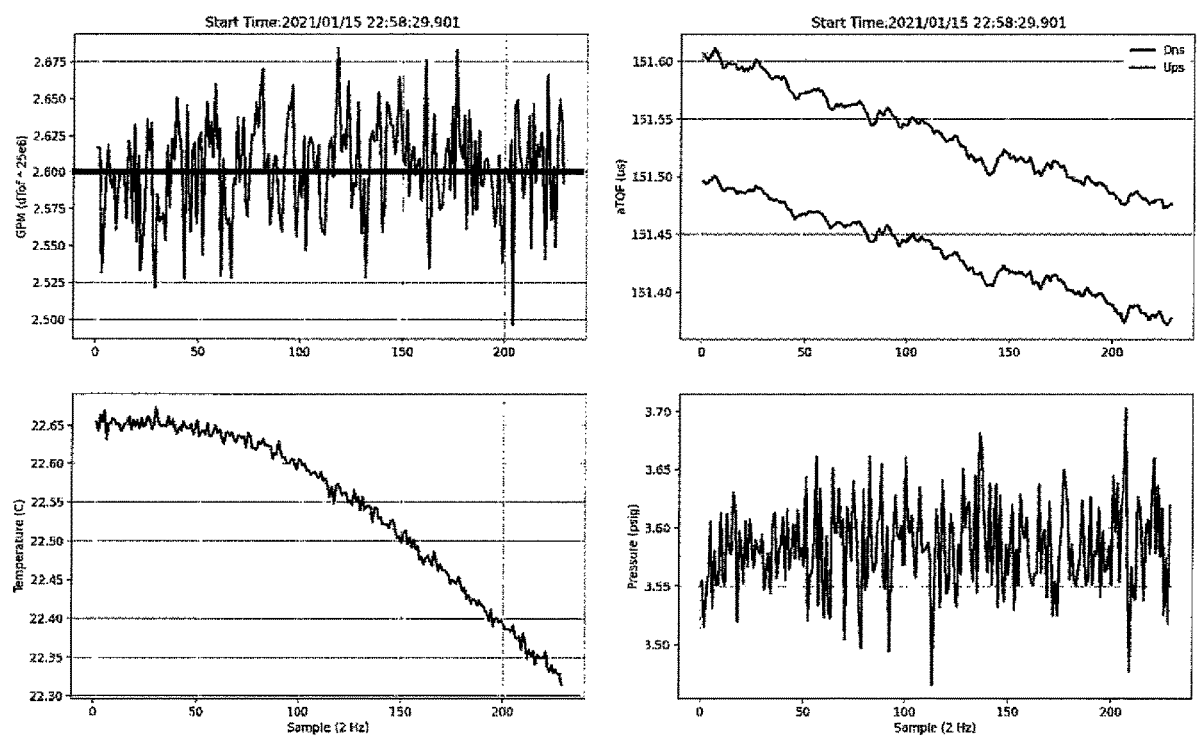
FIG. 11

(A) DIAMETRAL PATHS
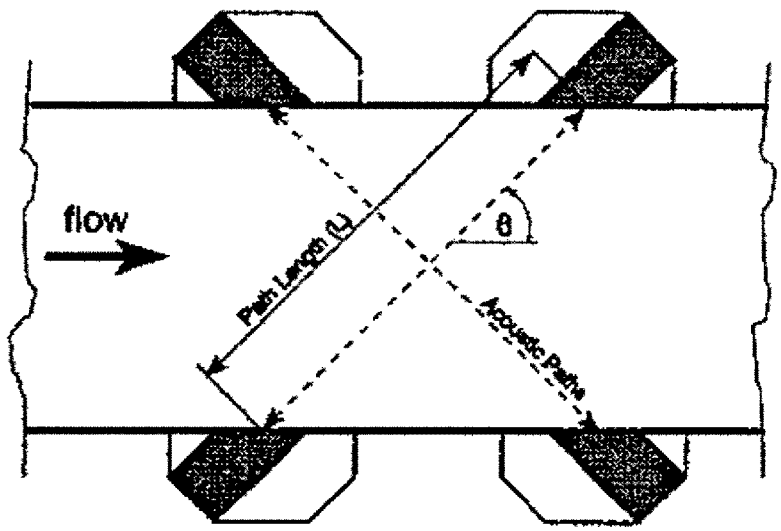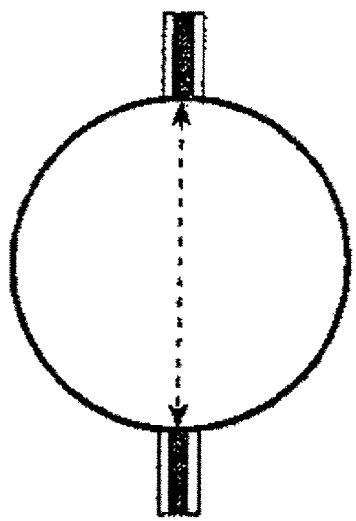
SIDE VIEW    END VIEW
(B) CHORDAL PATHS
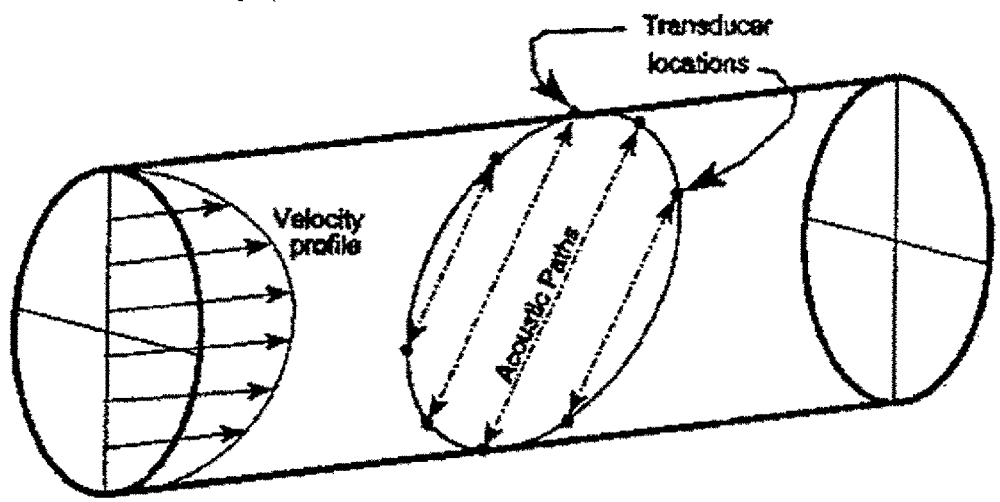
FIG. 16

Figure 1: Transducer mounting configurations

| Flow Calibration Station Layout | Definitions |
|---|---|
| A circulation system build on mechanical structure with a variable speed pump, a bypass line, a "Device Under Test" (DUT) line, a valve inline with DUT, a bypass valve on bypass line.<br><br>The system has multiple sensor/devices sending data/feedback to/from the calibration software, on a host computer. Sensors and Devices include reference temperature sensors (RTD), reference pressure sensors, fluid temperature control device, and reference Flow Meters.<br><br>A single or multiple uncalibrated ultrasonic flow meters are installed in the DUT line, in line with the reference sensors and reference meters. | DUT - Device Under Test<br>UPS - Up Stream Absolute Time of Flight Measurement<br>UPSSTD - Standard Deviation of UPS Measurements for Files/Directories<br>DNS - Down Stream Absolute Time of Flight Measurement<br>DNSSTD - Standard Deviation of DNS Measurements for Files/Directories<br>DTOF - Differential Time of Flight from UPS/DNS Measurements<br>ZF - Zero Flow<br>ZFRatio - Zero Flow Ratio<br>ZFRatioTemp - Zero Flow Ratio Temperature (Temperature Reference for ZF Measurements in the Field)<br>ZFDNS - Measured Absolute Zero Flow Time of Flight Down Stream at ZFRatioTemp<br>ZFUPS - Measured Absolute Zero Flow Time of Flight Up Stream at ZFRatioTemp<br>ZFMean - Average of ZF DTOF Measurements<br>ZFSTD - Standard Deviation of ZF DTOF Measurements from Array of ZF<br>KF/KFactor - Calibrated K Factor (Meter Constant)<br>KFSTD - Standard Deviation of the Array of K Factors from Different Files<br>Meter/Standard - Traceable Reference Meter Suitable for Calibration |

Calibration Parameters Configuration

Test Setup Structure
Precedence:TestFolder:TestName:TestType:Option1:Option2:Option3:Option4:Option5:Option6:

Descriptions
Precedence- Highest precedence in list will execute next
TestFolder- Is the folder that will be create or writen to, if exists
TestName- If single test(Is the file created),If multi-test(Is file that is create but enumerating after first)
TestType- Defines test parameters (options follow based on test type)
Rate- Set rate(GPM) for single test
LowestRate- Start rate(GPM) for test set
HighestRate- Highest rate(GPM) in test set
StepSize- Rate(GPM) addition to previous test in a test set, for the following test
NumberOfLoops- Number of Times to run complete test, whether single-rate/multi-rate/single-temp/multi-temp
Temperature(C)- Temperature setpoint for fluid during test(s)

TestType:1 -Precedence(0-100):TestFolder:TestName:TestType:TestDuration(S of each Test):Rate(GPM):NumberOfLoops(0 is a singleshot):
TestType:2 -Precedence(0-100):TestFolder:TestName:TestType:TestDuration(S of each Test):Rate(GPM):NumberOfLoops(0 is a singleshot):Temperature(C):
TestType:3 -Precedence(0-100):TestFolder:TestName:TestType:TestDuration(S of each Test):LowestRate(GPM):HighestRate(GPM):StepSize(GPM):NumberOfLoops(0 is a singleshot):
TestType:4 -Precedence(0-100):TestFolder:TestName:TestType:TestDuration(S of each Test):LowestRate(GPM):HighestRate(GPM):StepSize(GPM):NumberOfLoops(0 is a singleshot):Temperature(C):

FIG. 25

| Flow Calibration Station Layout | Definitions |
|---|---|
| A circulation system build on mechanical structure with a variable speed pump, a bypass line, a "Device Under Test" (DUT) line, a valve inline with DUT, a bypass valve on bypass line. | Experimental Thermal Expansion Correction Factor - E(T)<br>DUT - Device Under Test<br>Meter/Standard - Traceable Reference Meter Suitable for Calibration |
| The system has multiple sensor/devices sending data/feedback to/from the calibration software, on a host computer. Sensors and Devices include reference temperature sensors (RTD), reference pressure sensors, fluid temperature control device, and reference Flow Meters. | |
| A single or multiple uncalibrated ultrasonic flow meters are installed in the DUT line, in line with the reference sensors and reference meters. | |

Calibration Parameters Configuration

Test Setup Structure
Precedence:TestFolder:TestName:TestType:Option1:Option2:Option3:Option4:Option5:Option6:

Descriptions
Precedence- Highest precedence in list will execute next
TestFolder- Is the folder that will be created or written to, if exists
TestName- If single test(Is the file created),If multi-test(Is file that is create but enumerating after first)
TestType- Defines test parameters (options follow based on test type)
Rate- Set rate(GPM) for single test
LowestRate- Start rate(GPM) for test set
HighestRate- Highest rate(GPM) in test set
StepSize- Rate(GPM) addition to previous test in a test set, for the following test
NumberOfLoops- Number of Times to run complete test, whether single-rate/multi-rate/single-temp/multi-temp
Temperature(C)- Temperature setpoint for fluid during test(s)

TestType:1 -Precedence(0-100):TestFolder:TestName:TestType:TestDuration(S of each Test):Rate(GPM):NumberOfLoops(0 is a singleshot):
TestType:2 -Precedence(0-100):TestFolder:TestName:TestType:TestDuration(S of each Test):Rate(GPM):NumberOfLoops(0 is a singleshot):Temperature(C):
TestType:3 -Precedence(0-100):TestFolder:TestName:TestType:TestDuration(S of each Test):LowestRate(GPM):HighestRate(GPM):StepSize(GPM):NumberOfLoops(0 is a singleshot):
TestType:4 -Precedence(0-100):TestFolder:TestName:TestType:TestDuration(S of each Test):LowestRate(GPM):HighestRate(GPM):StepSize(GPM):NumberOfLoops(0 is a singleshot):Temperature(C):

FIG. 33

HIGH SENSITIVITY ULTRASONIC FLOW METER

Related Applications: This application claims the benefit of priority to United States Provisional Patent Application titled HIGH SENSITIVITY ULTRASONIC FLOW METER, assigned Ser. No. 63/186,789, filed May 10, 2021.

FIELD OF THE INVENTION

The present invention relates generally to fluid flow sensors. The present invention is more particularly directed to a high sensitivity fluid flow sensor using an ultrasonic sensor pair to determine fluid flow rates.

Background of the Invention

In detecting flow rates as applied to leak detectors, it is very important to sense even the slightest flow as a leak as small as a few drops a minute can manifest itself over time to a catastrophic loss. As a result, it is advantageous to provide a high sensitivity flow meter.

SUMMARY OF THE INVENTION

The present invention utilizes an up-stream and down-stream ultrasonic sensor path to determine relative flow based on a differential time-of-flight measurement. Once the base measurement is obtained, a series of mathematical filters are applied to the sensor detection readings to differentiate the signal characteristics from the background noise characteristics. These filters may be accomplished using digital signal processing techniques coupled with a creative architecture for the acoustic sensor chambers in line with the fluid flow to maximize sensitivity. The basic chamber designs and mathematical calculations to determine the flow rates are described herein.

BRIEF DESCRIPTION OF THE DRAWINGS

FIG. 5 is a set of graphs of flow data from the high sensitivity ultrasonic flow meter, shown alongside readings from a US meter;

FIG. 6 is another set of graphs of flow data from the high sensitivity ultrasonic flow meter, shown alongside readings from a US meter;

FIG. 7 is another set of graphs of flow data from the high sensitivity ultrasonic flow meter, shown alongside readings from a US meter;

FIG. 8 is another set of graphs of flow data from the high sensitivity ultrasonic flow meter, shown alongside readings from a US meter;

FIG. 9 is another set of graphs of flow data from the high sensitivity ultrasonic flow meter, shown alongside readings from a US meter;

FIG. 10 is another set of graphs of flow data from the high sensitivity ultrasonic flow meter, shown alongside readings from a US meter;

FIG. 11 is another set of graphs of flow data from the high sensitivity ultrasonic flow meter, shown alongside readings from a US meter;

FIG. 16 is a path diagram of acoustic paths through fluid used for the calculation of flow rate;

FIG. 25 is a table illustrating exemplary layout and parameter configurations;

FIG. 27, FIG. 28, FIG. 29, FIG. 30, FIG. 31, FIG. 32, and FIG. 33 are enlargements of each portion of the flowchart;

DETAILED DESCRIPTION OF A PREFERRED EMBODIMENT

Ultrasonic Meter

Figure 1:
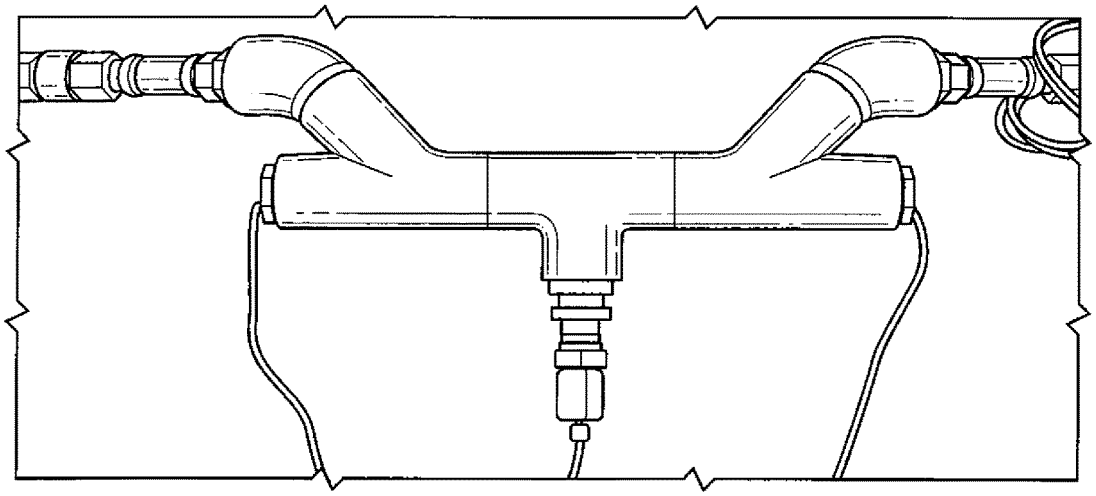
FIG. 1 is a front view of a high sensitivity ultrasonic flow meter.

Overview:
  Prototype hardware complete
  Prototype electronics complete
  Basic firmware complete
  Capable of detecting sub drop per second flow*
  Capable of "residential" (non class designated metering) based on single point calibration (~95% accuracy at 25 C)**
  *Detecting is defined as the ability to determine flow at or above said rate is active, accuracy is not taken into consideration in this range. In other words we are considering this flow region the "leak detection" realm and not metering.
  **Single point calibration is defined as the following.
  Multipoint metering (when needed) can be implemented to achieve class 1 or 2 metering (see calibration and Appendix)
  Prototype A prototype meter is illustrated in FIG. 1.

Figure 2:
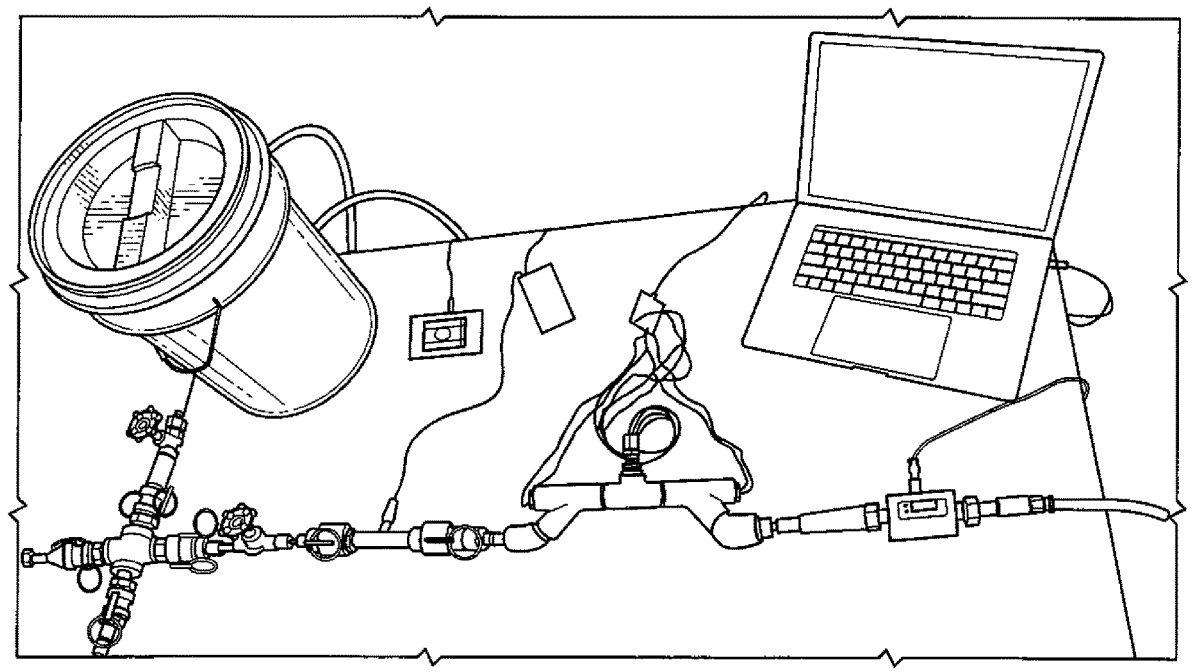
FIG. 2 is a perspective view of the high sensitivity ultrasonic flow meter shown in use on a test bench.

Referring now to FIG. 2, all the graphs in the following figures are generated from data obtained from the prototype ultrasonic meter.

The test bench used was as follows: tank→pump→ref. Meter→US meter→Ids→tank Test bench.

Zero Flow

Figure 3:
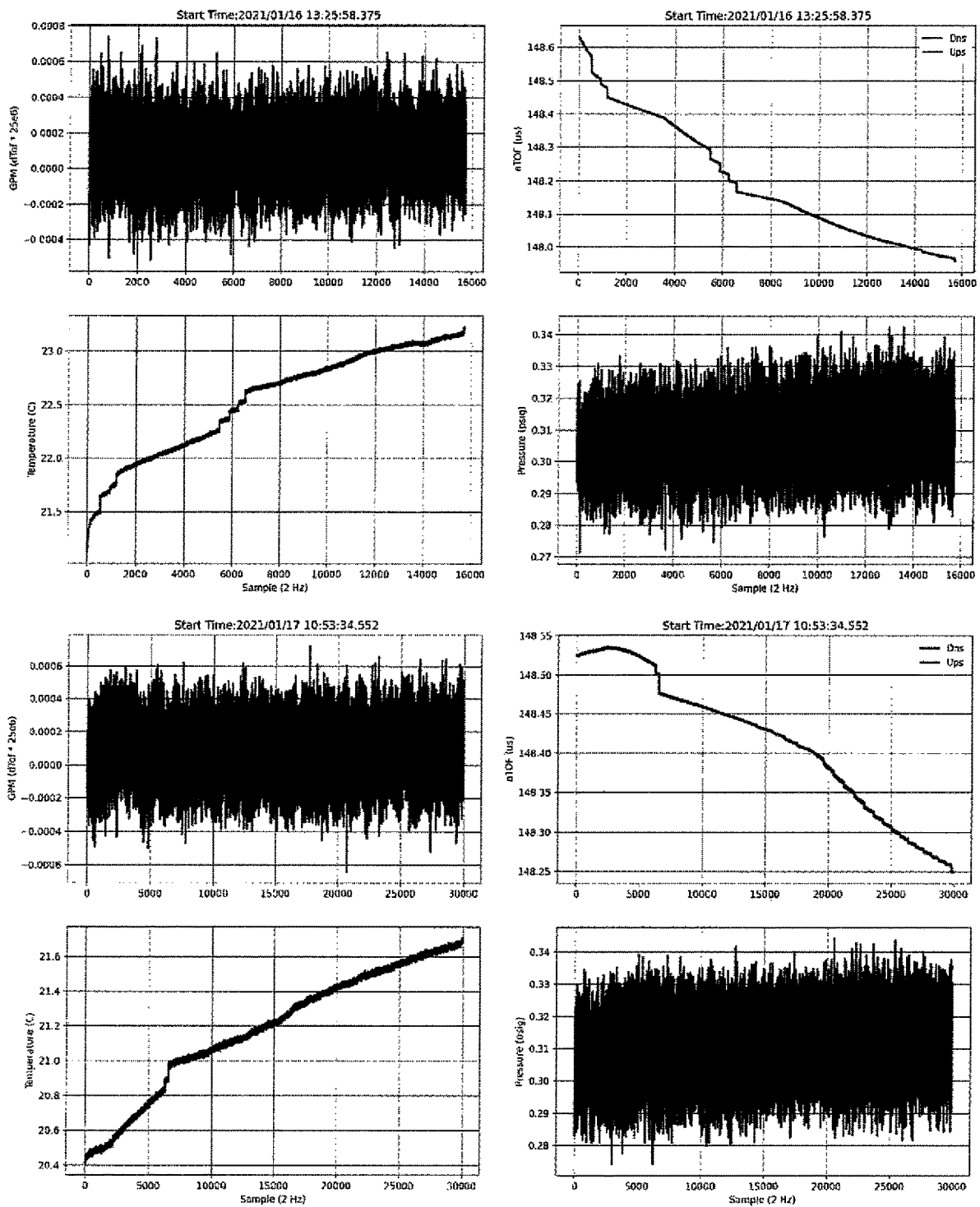
FIG. 3 is a set of graphs of zero flow measurements from the high sensitivity ultrasonic flow meter.

FIG. 3 illustrates zero flow measurements for the ultrasonic (US) meter. Zero flow drift can be seen below for multiple hour periods. This is an important characteristic as it allows us to determine the noise band over a range of temperatures. This is the greatest factor when determining the minimum detectable flow.

US Minimum Detectable Flow

Figure 4:
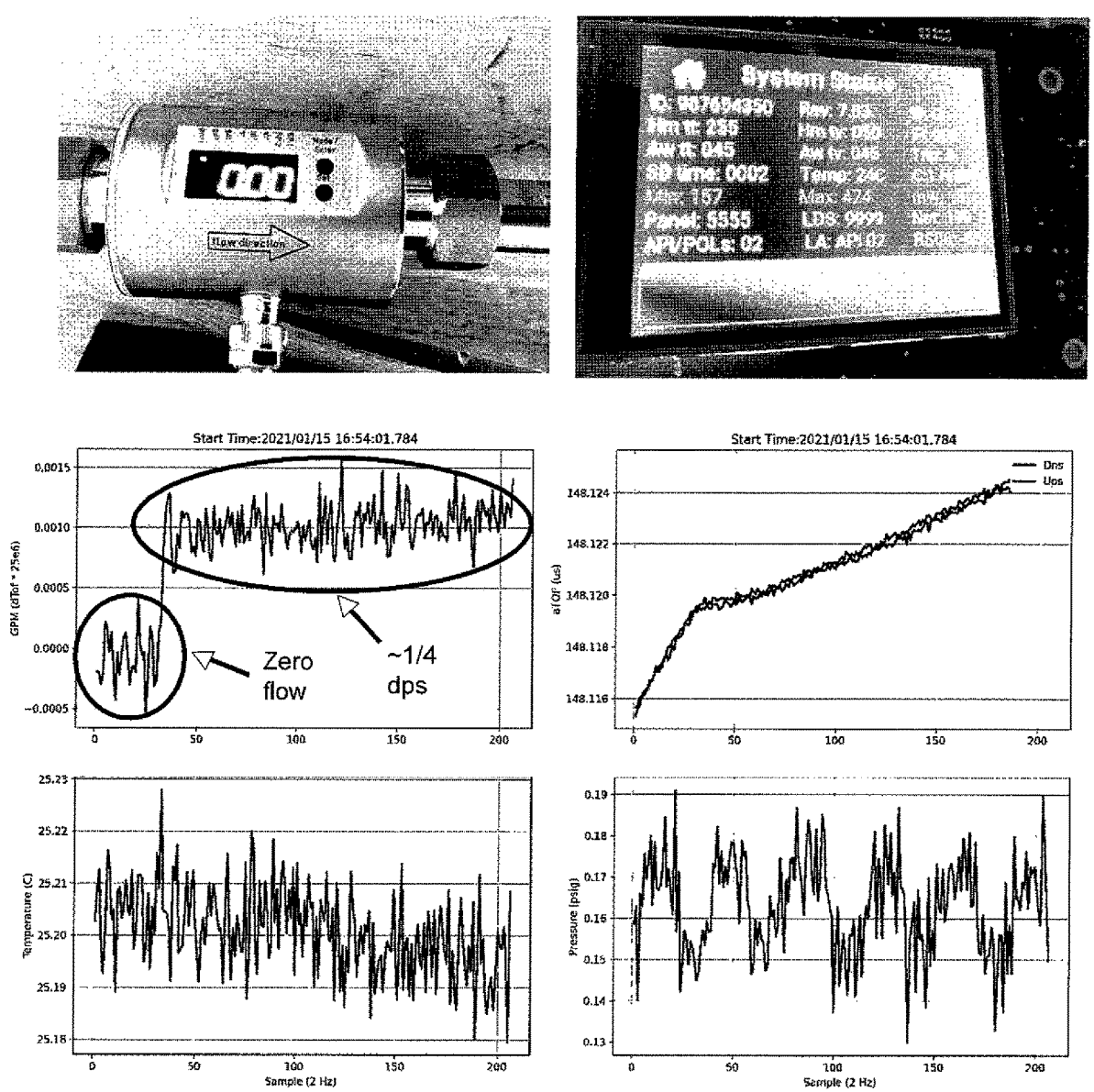
FIG. 4 is a set of graphs of minimum detectable flow from the high sensitivity ultrasonic flow meter, shown alongside readings from a US meter and pressure and temperature readings.

FIG. 4 illustrates about ¼ drop per sec (dps) flow readings for IMF mag meter (undetectable), LDS (undetectable), and US meter respectively.
(LDS and US flow body=¾" npt)
(Pressure and temperature reading from WNK sensor on US i2c bus)

Flow Data

Referring now to FIG. 5, a US meter with single point calibration based on the reference mag meter is shown. Properly Calibrated meter will implement a multi-point multi-temperature calibration capable of achieving class 1 meter status (1% reading accuracy over Q2, Q3, Q4 [see appendix]).

Referring now to FIGS. 6-11, a US meter with single point calibration based on the reference mag meter is shown with various readings.

Figure 12:
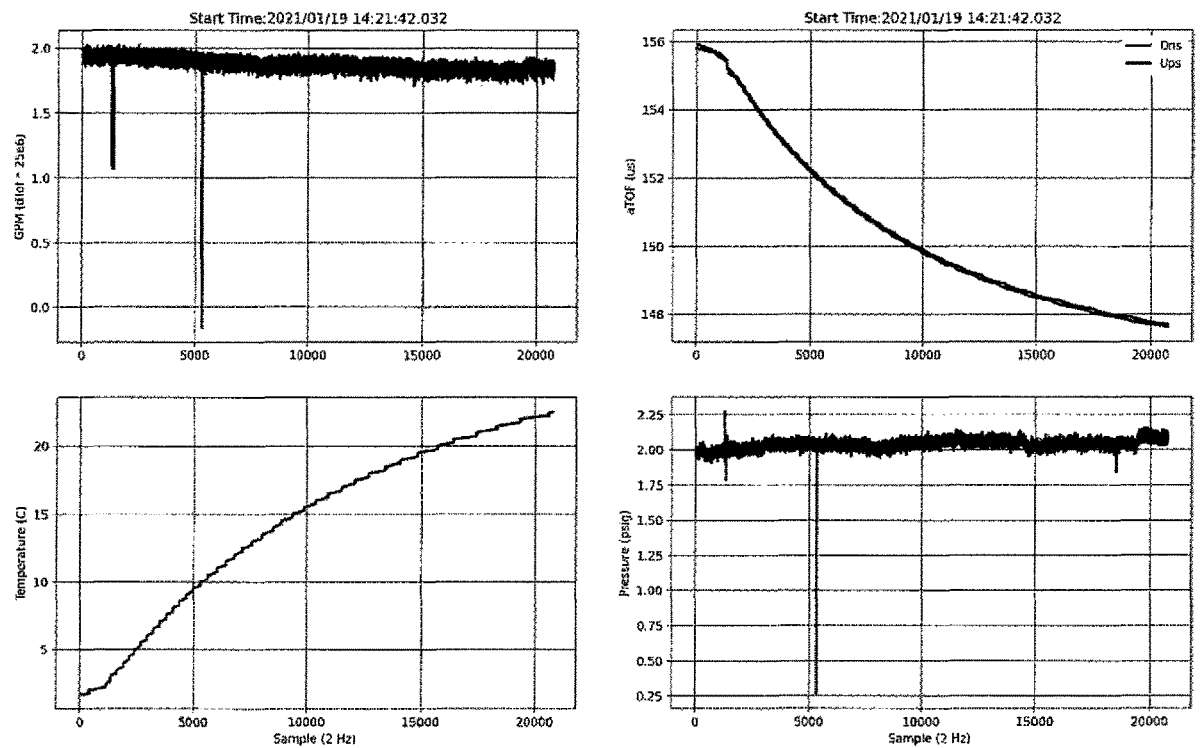
FIG. 12 is a set of graphs of flow data from the high sensitivity ultrasonic flow meter.

Referring now to FIG. 12, a graph of flow data is illustrated using a US meter with single point calibration based on the reference mag meter over a large temperature range.

Here we can see an approximate drift of around 10% as the temperature ramps up from 1 C to 25 C.

This drift can be avoided by a multi temperature calibration.

Pressure Data

Figure 13:
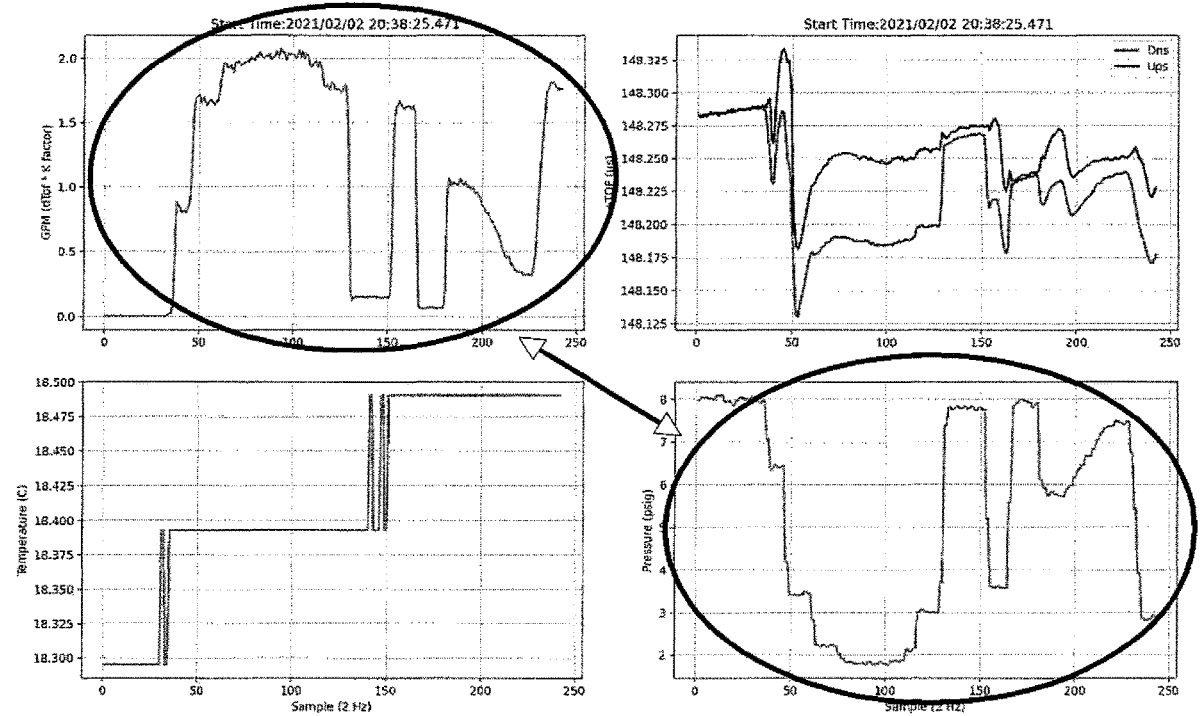
FIG. 13 is a set of graphs showing inverse correlation of pressure and flow.

Referring now to FIG. 13, Pressure/flow inverse correlation confirmation is illustrated:
verification of fluid motion below (or above) noise floor based on inverse relationship between fluid velocity and dynamic pressure.

Bernoulli, applicable in all confirmation of fluid motion change.

Signal Processing

Figure 14:
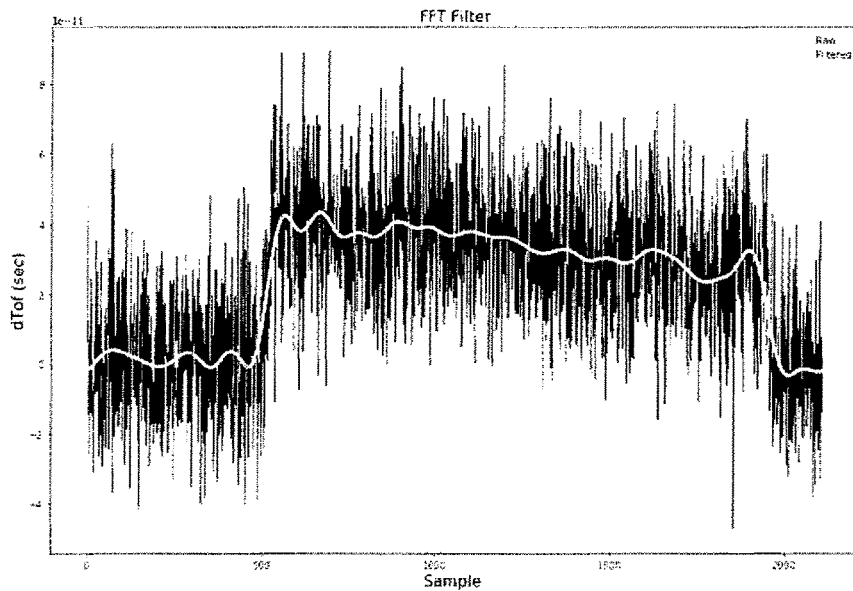
FIG. 14 is a graph showing the use of signal processing for smoothing the raw data.
Figure 15:
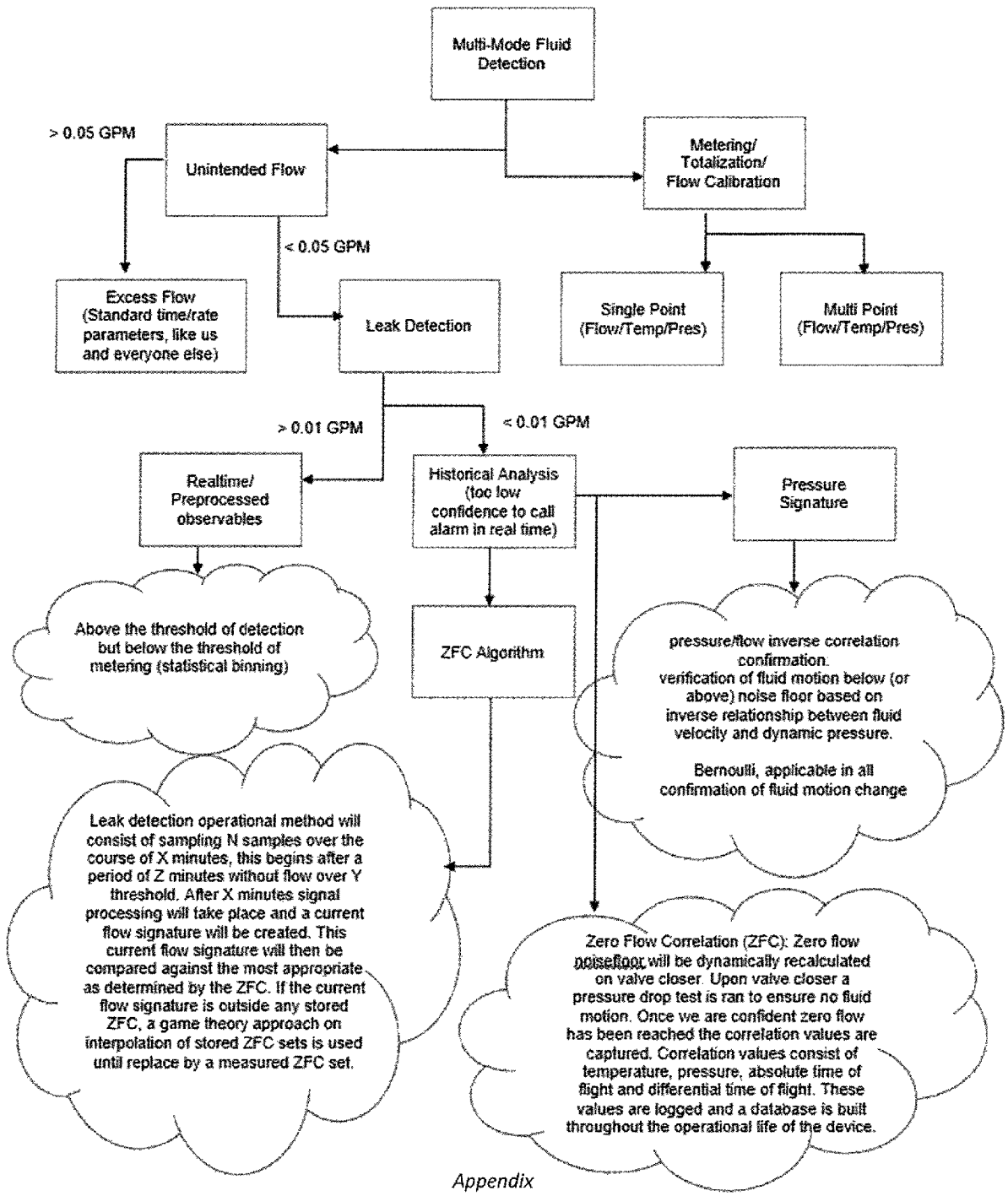
FIG. 15 is a diagram of multi-mode fluid detection as performed by the high sensitivity ultrasonic flow meter.
Figure 17:
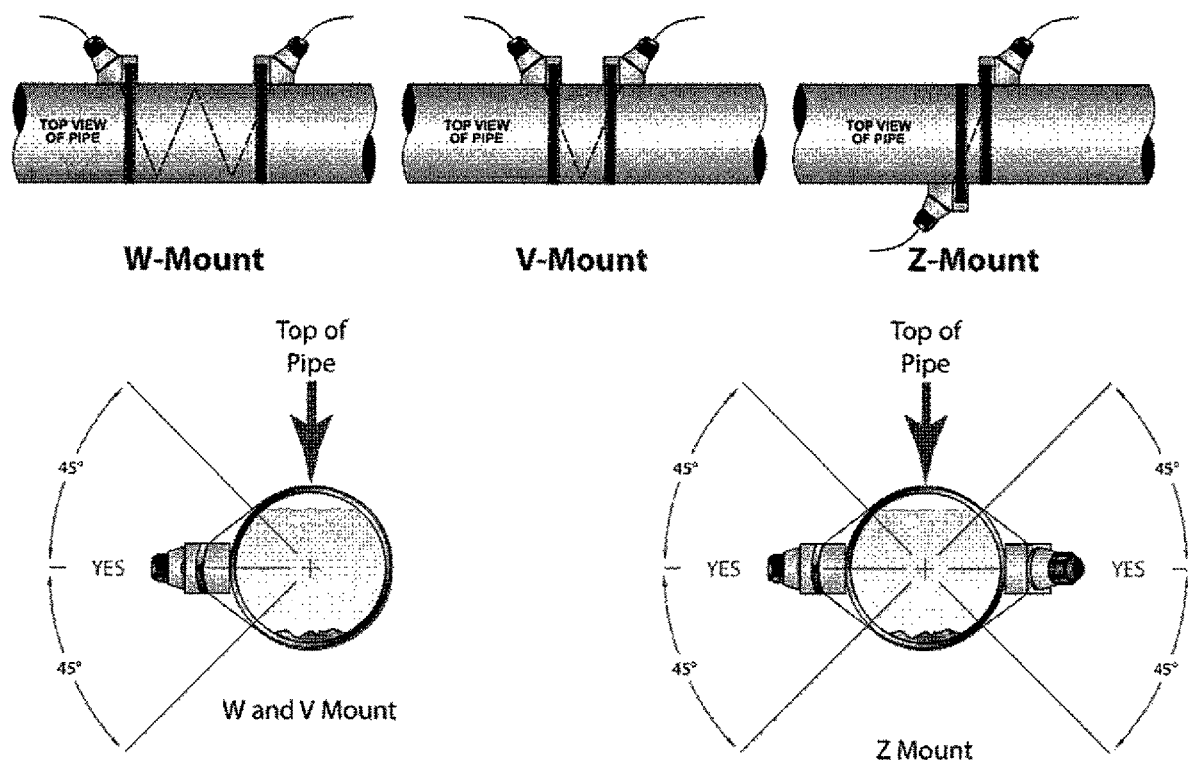
FIG. 17 is a diagram of transducer mounting configurations.
Figure 18:
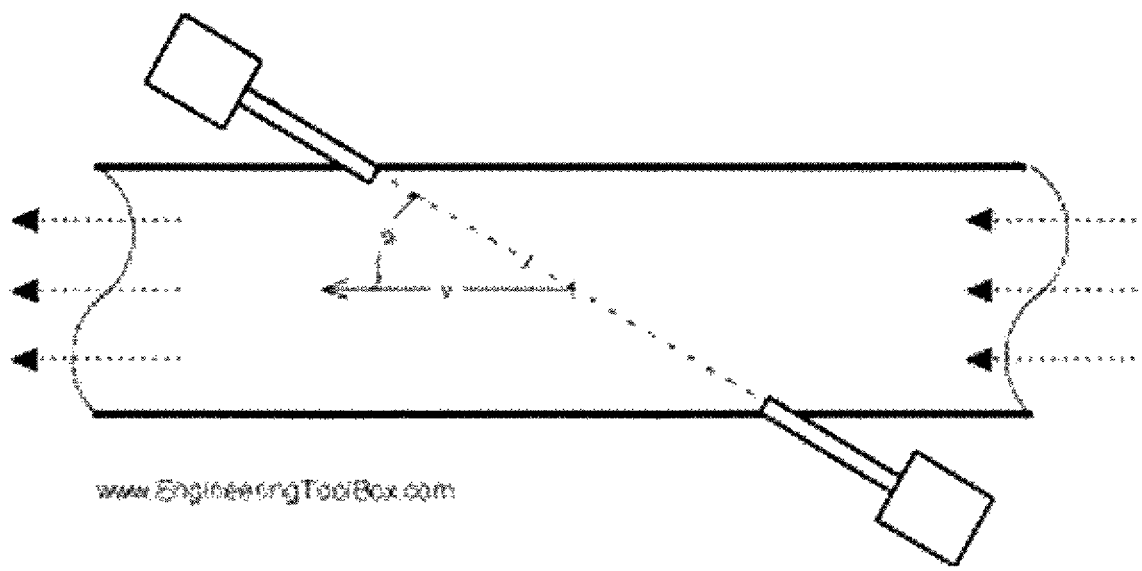
FIG. 18 is another diagram of paths through fluid.
Figure 19:
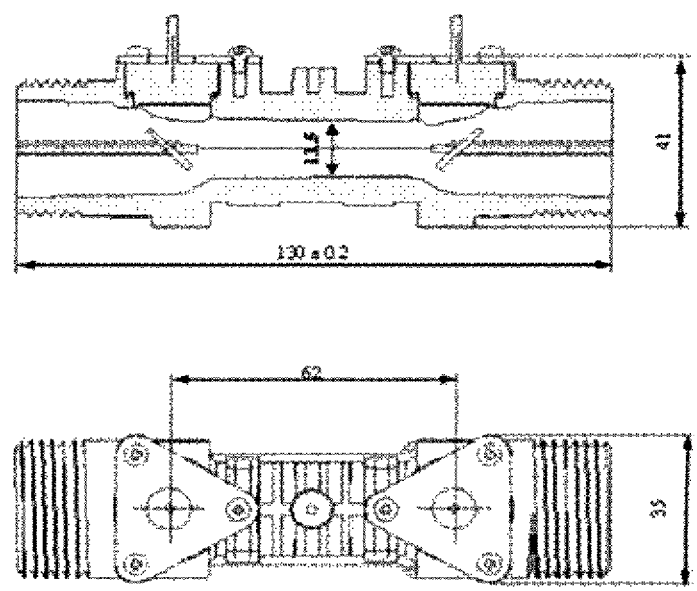
FIG. 19 is a diagram of transducer mount dimensions.
Figure 20:
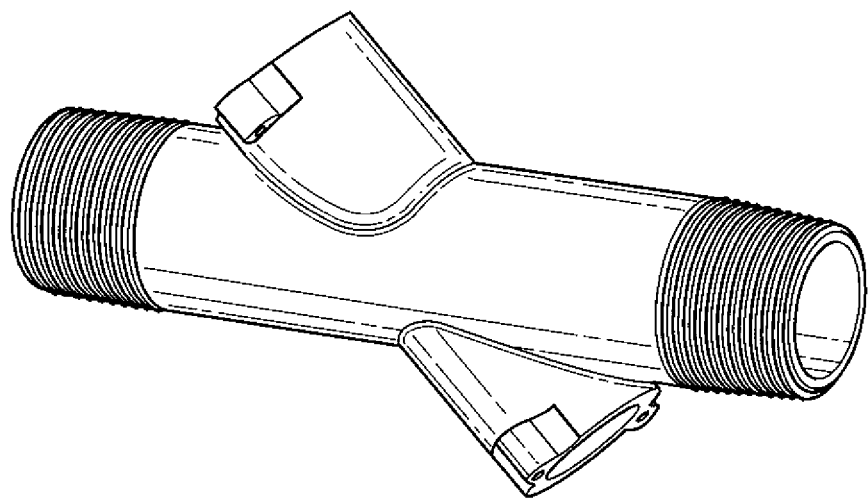
FIG. 20 is a perspective view of a pipe segment with an exemplary sensor mounting configuration.
Figure 21:
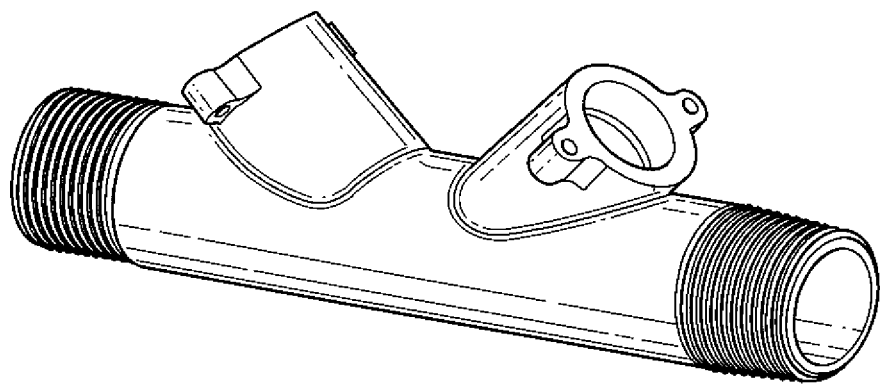
FIG. 21 is a perspective view of a pipe segment with another exemplary sensor mounting configuration.
Figure 22:
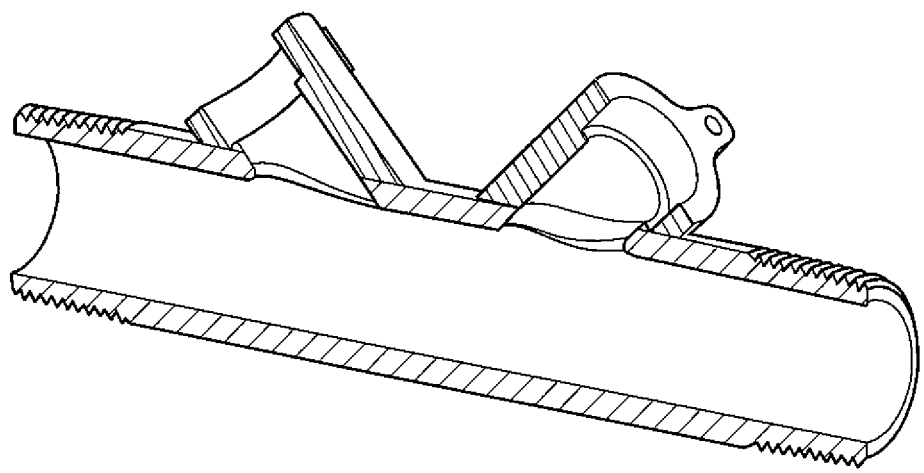
FIG. 22 is a perspective cutaway view of the pipe segment.
Figure 23:
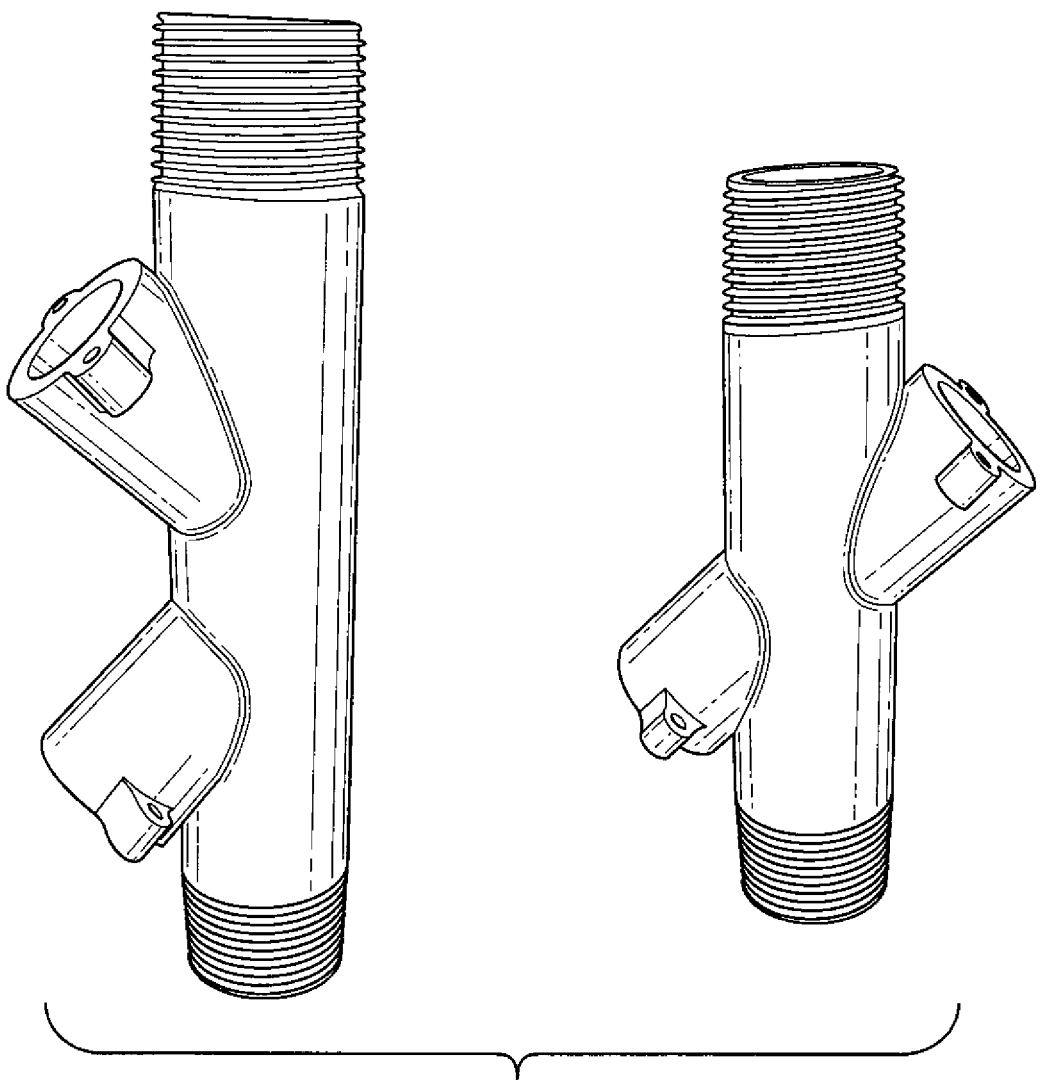
FIG. 23 is another perspective view of the exemplary pipe segment configurations.
Figure 24:
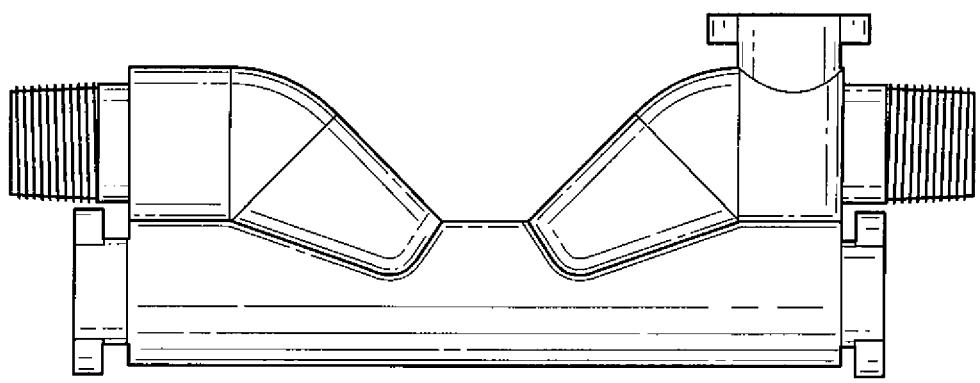
FIG. 24 is a diagram of a pipe segment showing exemplary transducer and pressure/temperature sensor configurations and fluid flow.
Figure 26:
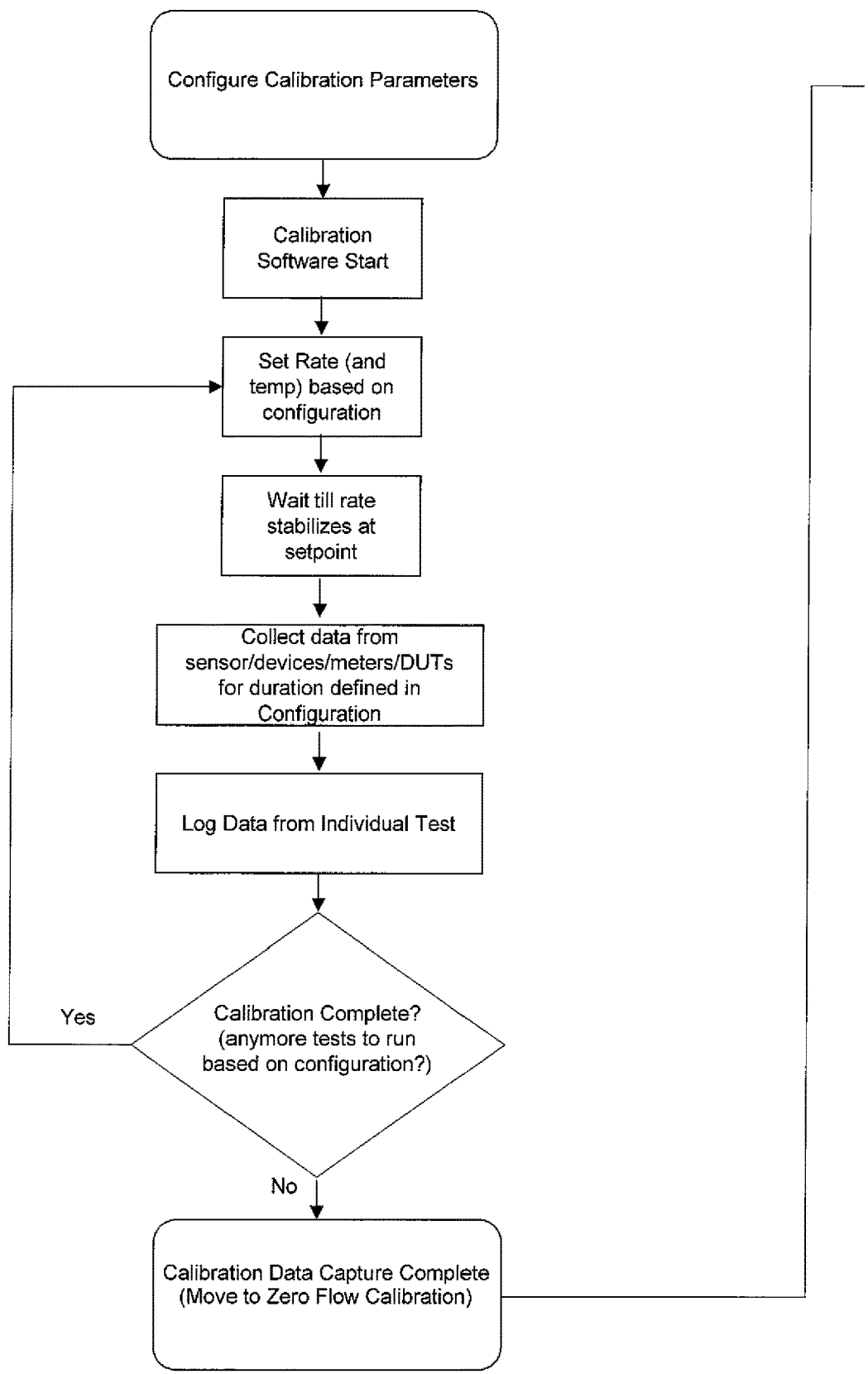
FIG. 26 is a flowchart depicting a process of flow analysis using a high sensitivity ultrasonic flow meter.
Figure 27:
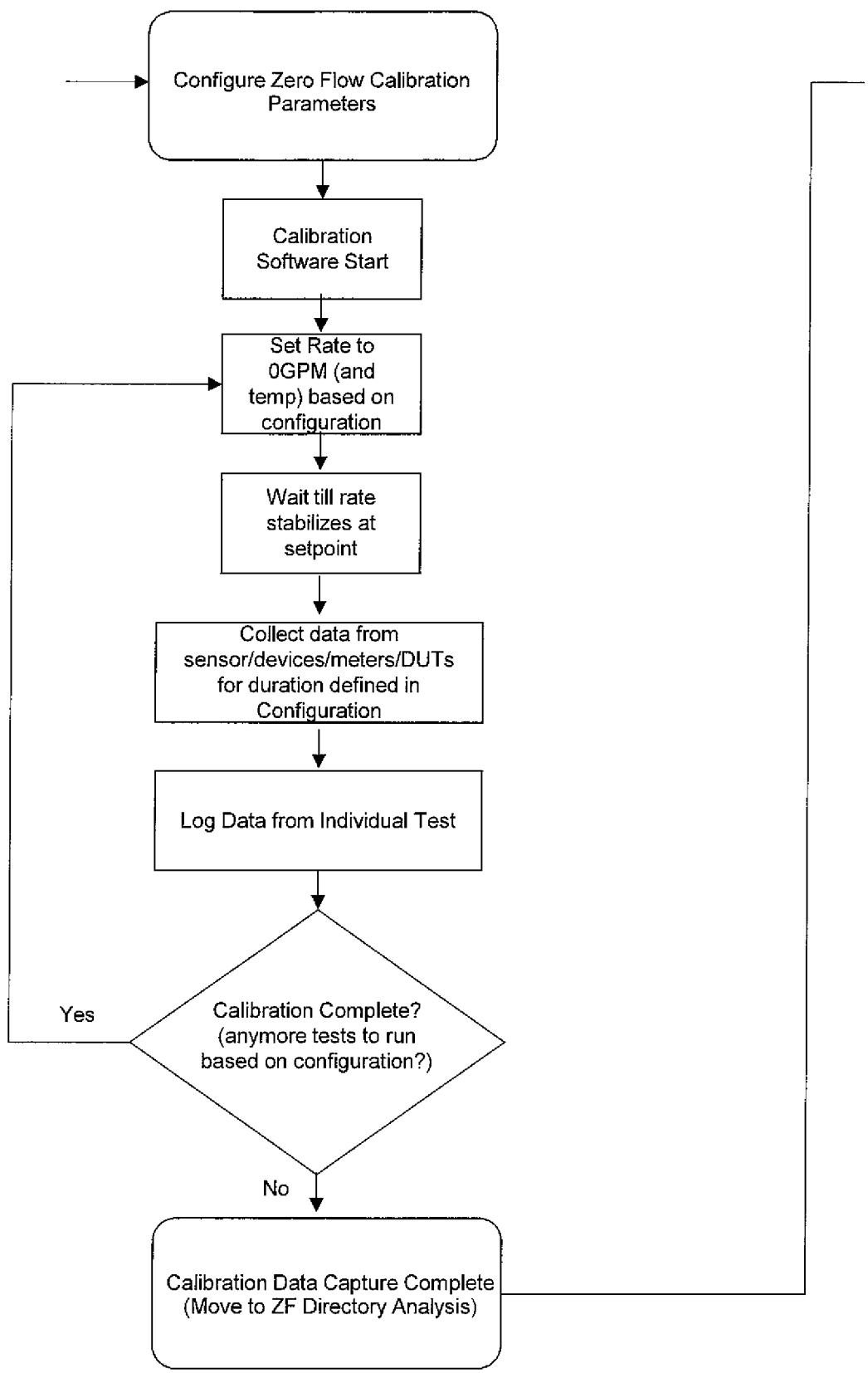
Figure 28:
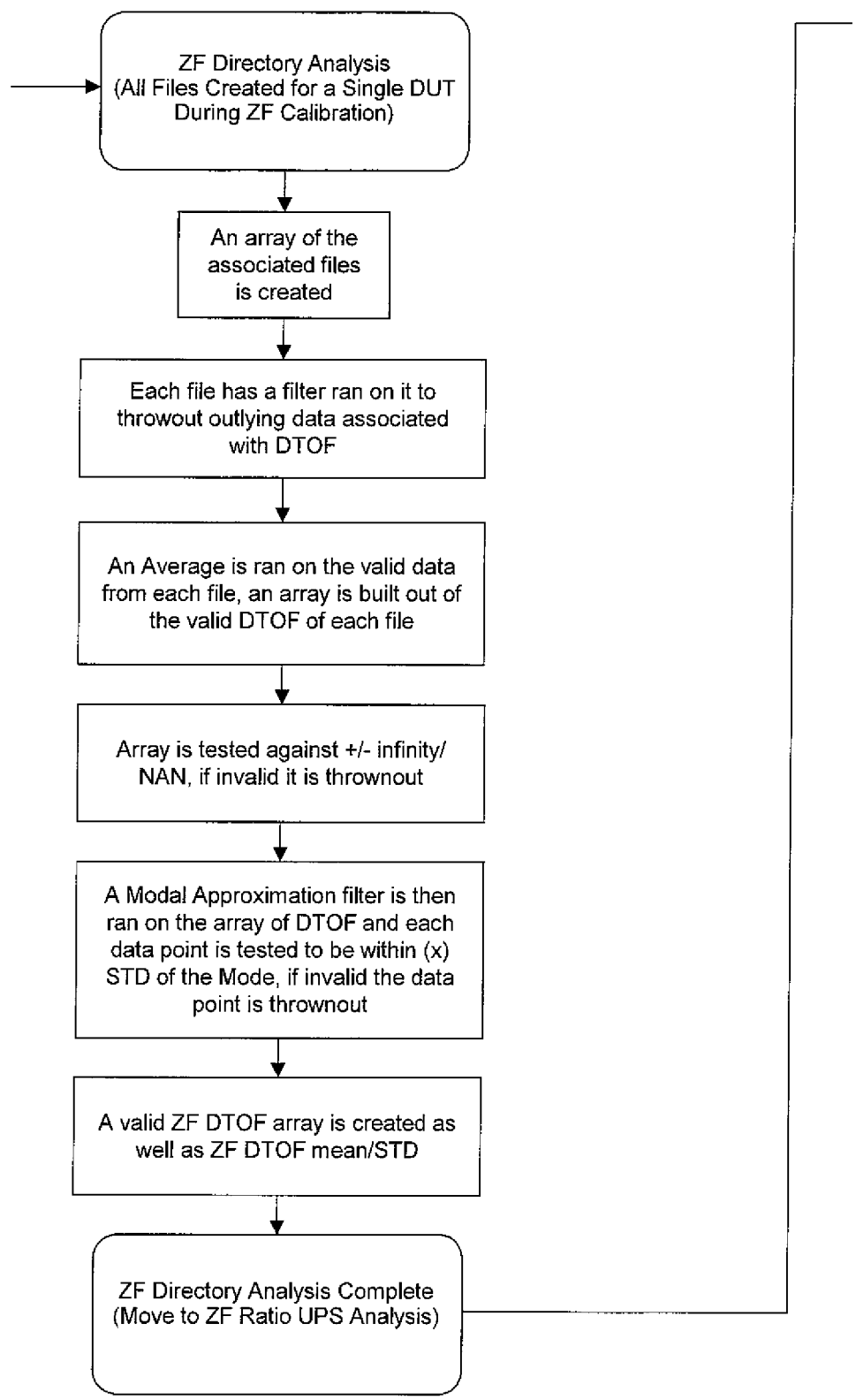
Figure 29:
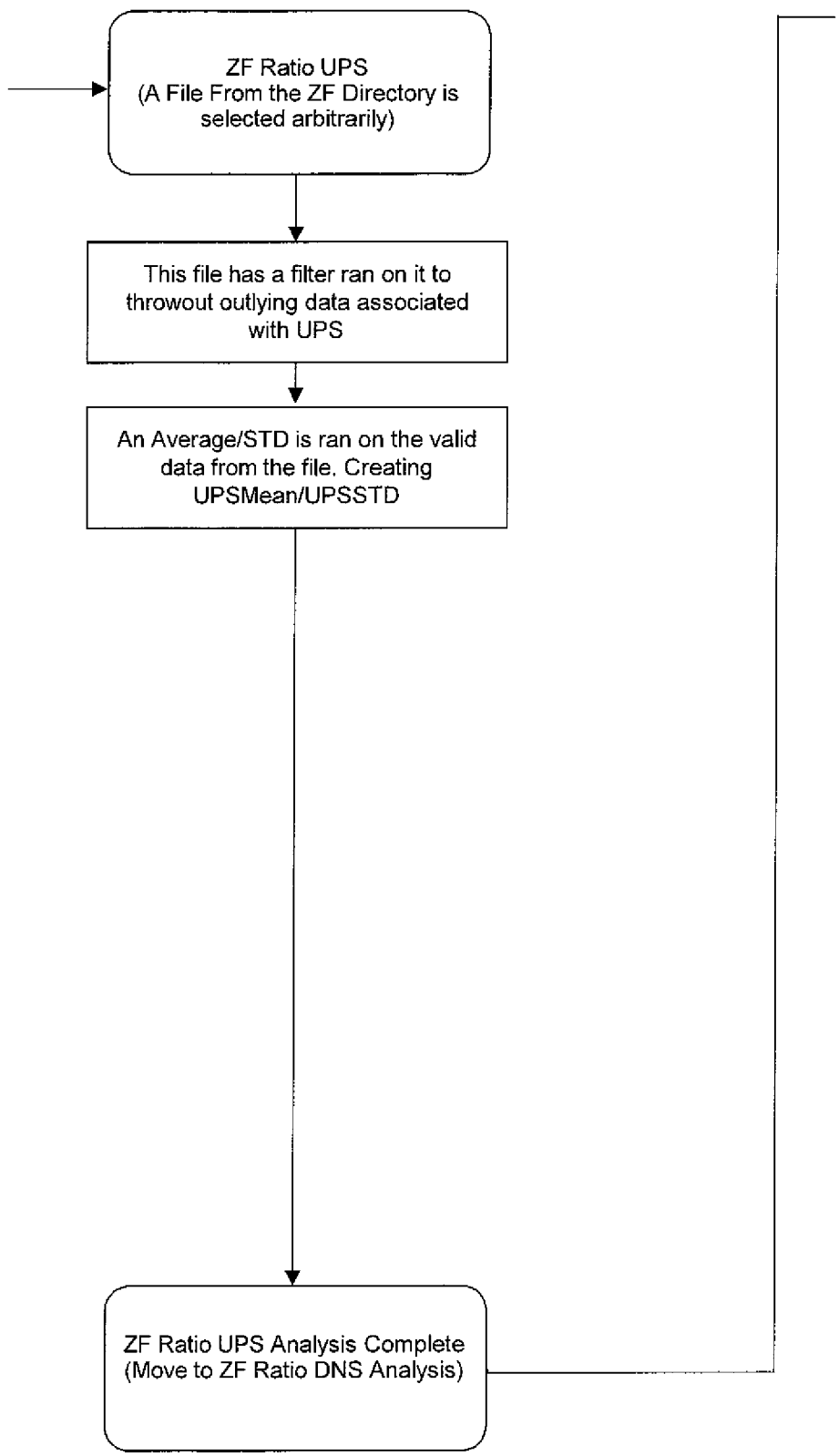
Figure 30:
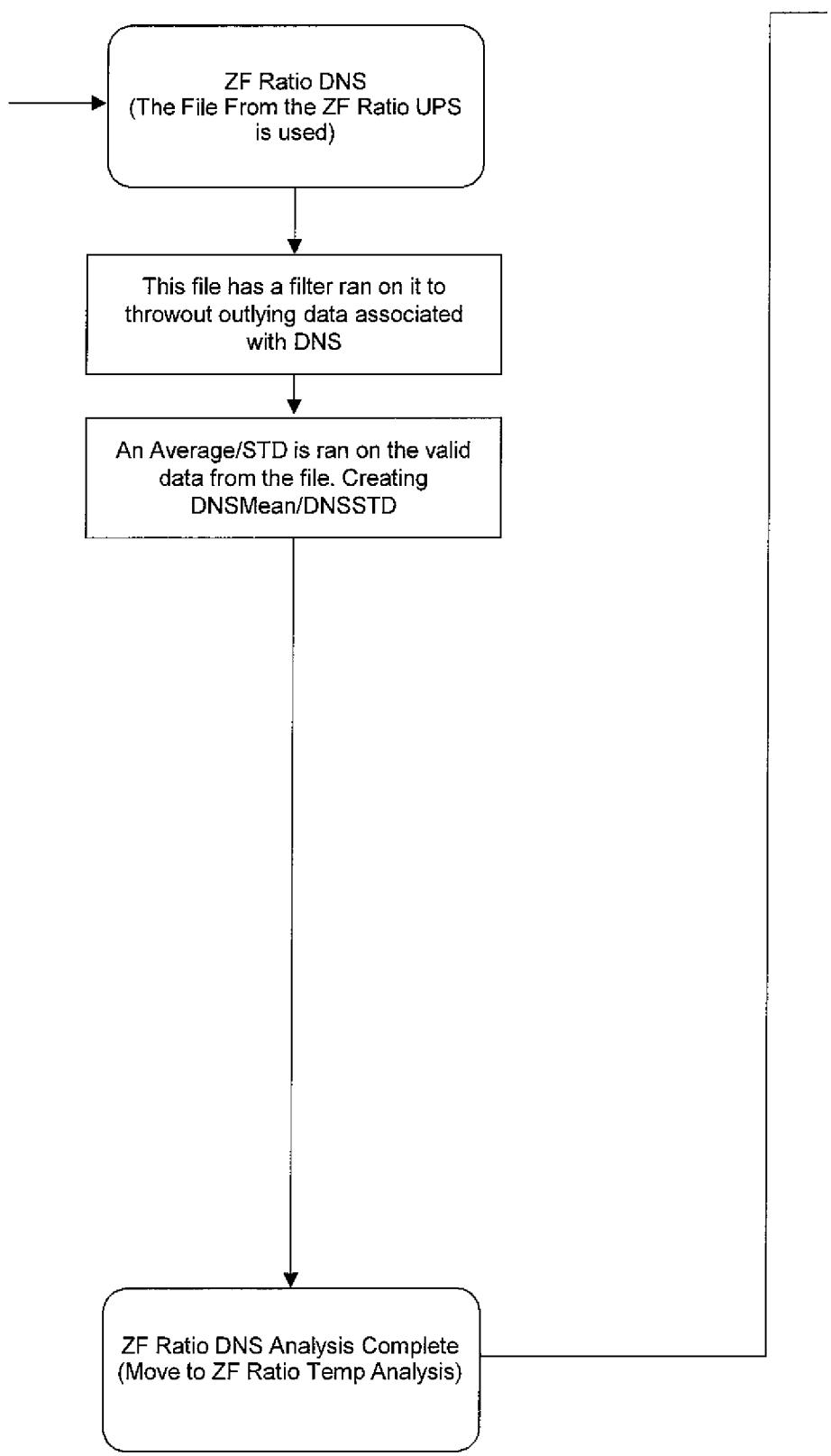
Figure 31:
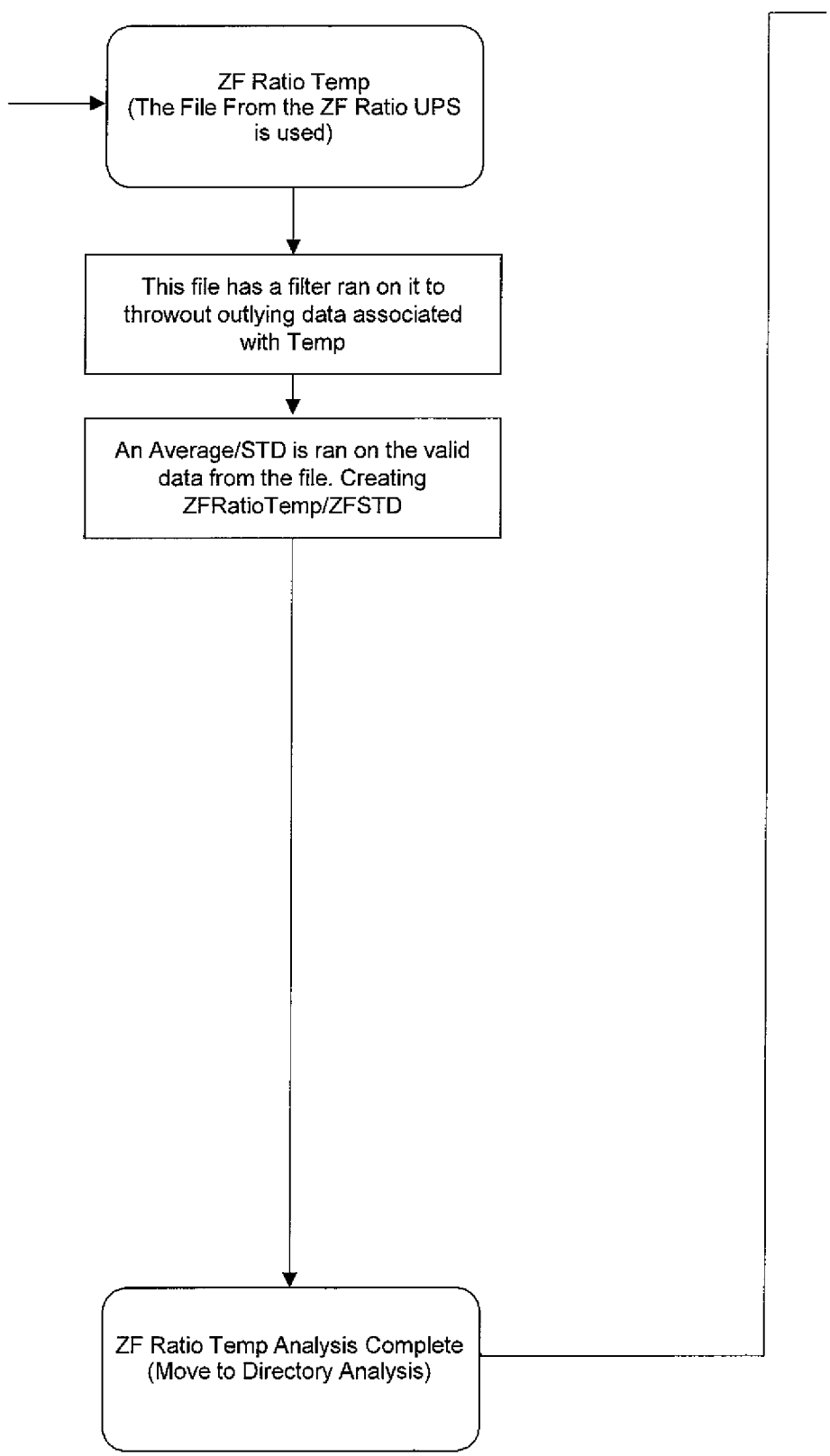
Figure 32:
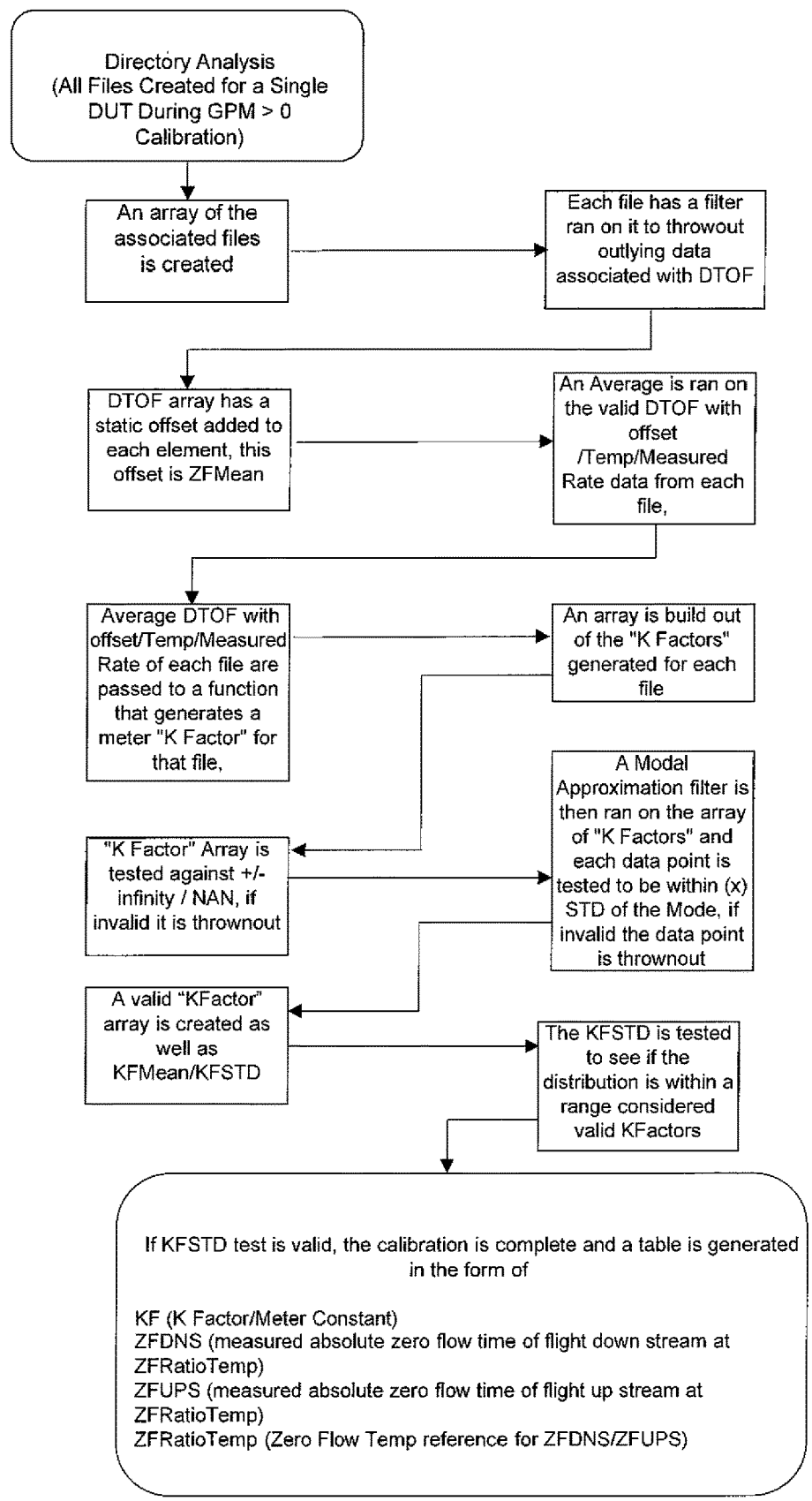
Figure 34:
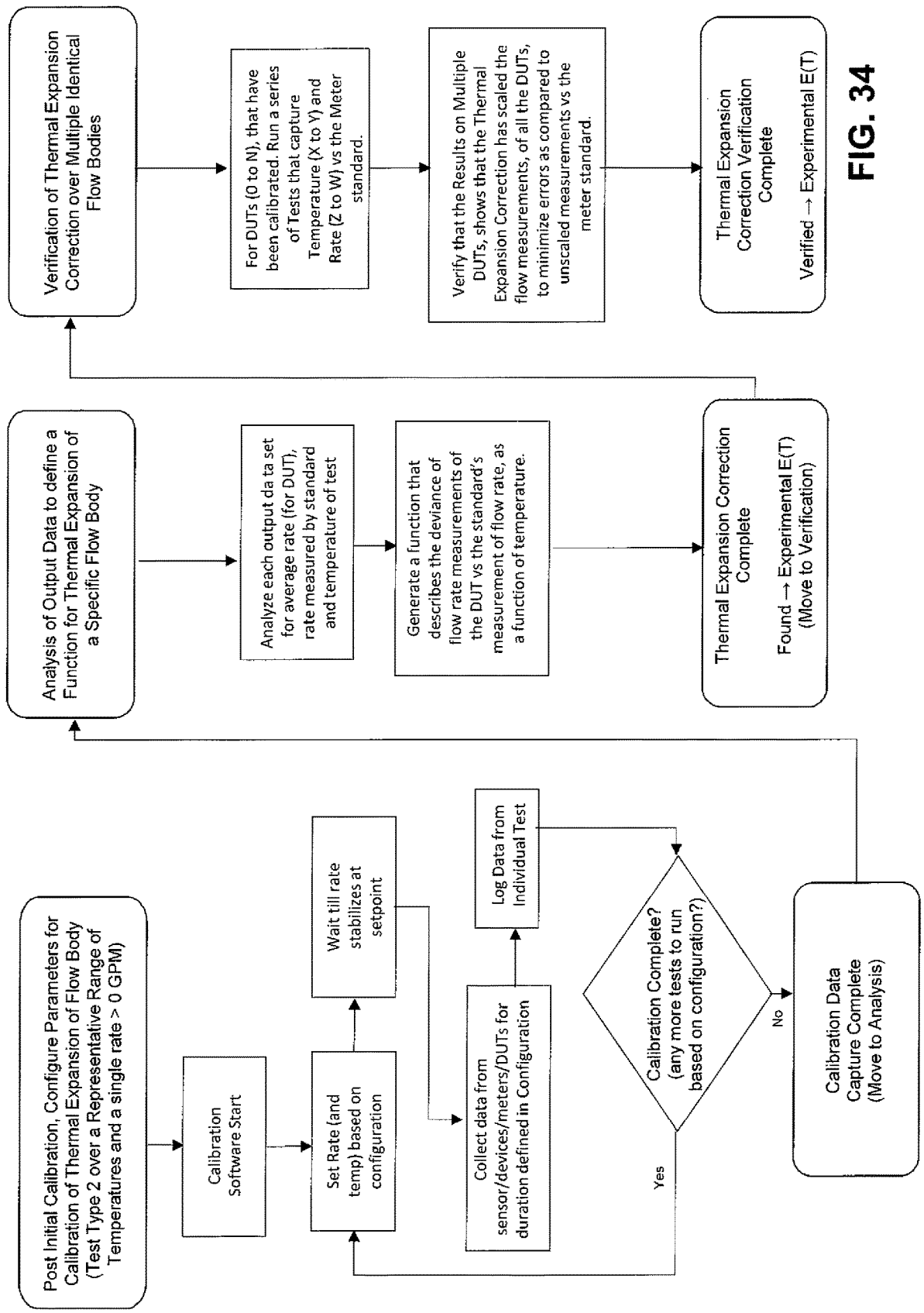
FIG. 34 is a table illustrating exemplary flow calibration station layout and calibration parameters.
Figure 35:
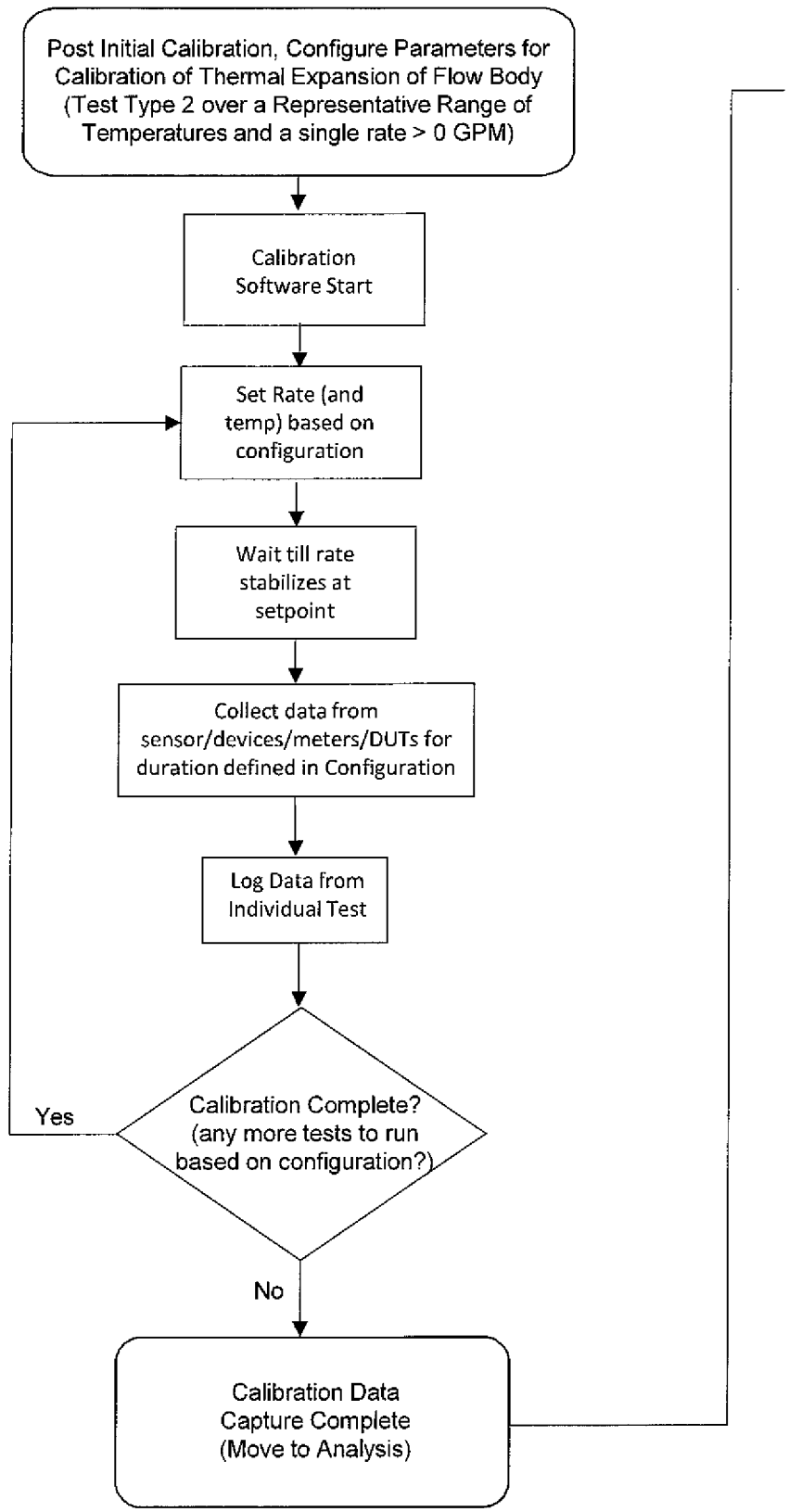
FIGS. 35, 36, and 37 are portions of a flowchart depicting a process of flow analysis using a high sensitivity ultrasonic flow meter.
Figure 36:
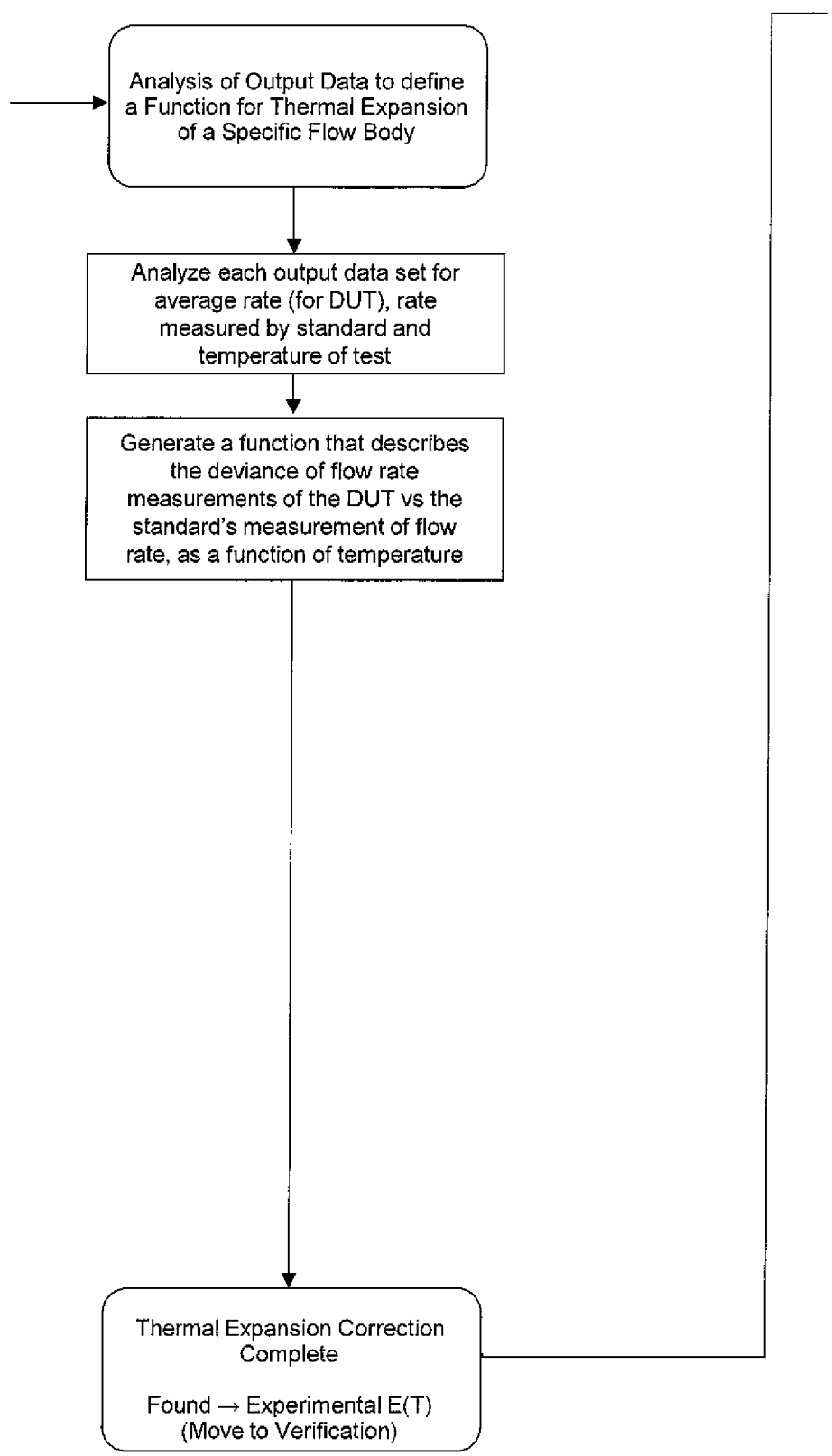
Figure 37:
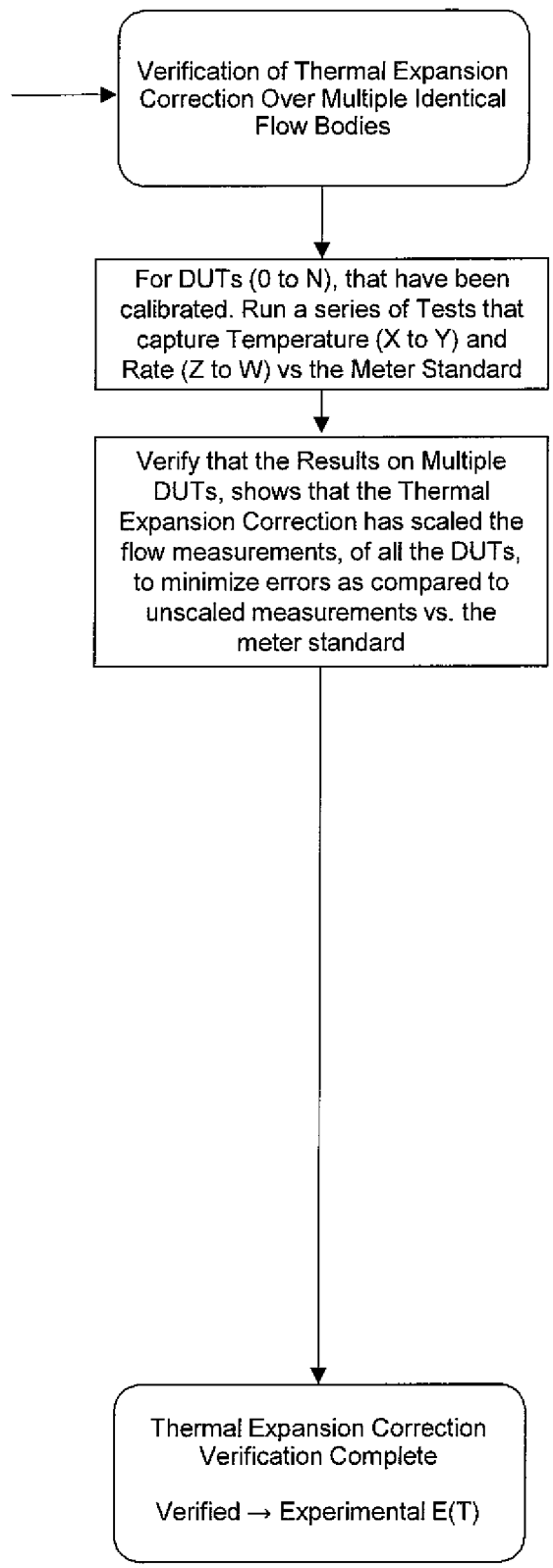

Referring now to FIG. 14, All previous data is raw and direct from the ultrasonic microcontroller. Below we can see an example of data being smoothed using a pseudo real time transform. This is the foundation of many of the algorithms being developed.

The patentable IP will be in the algorithms and sensor correlations that fall out of the data.
Leak Detection:

Such as the possibility of a frequency measurement of impulses from drops dripping perhaps sinusoidal and using that as the measurement over flow/TOF.

Metering:
Using special substitution FIR filtering to deal with real time data looking out of place and displaying the corrected current flow rate
Totalization:
Using special substitution IIR filtering, to deal with historical data anomalies that throw off the totalization tally, then calculating or recalculating the tally based on historical and current data sets.

Referring now to FIGS. 15-37 the operation of the invention, its manner of functioning, and analysis of measurement results is illustrated and described in detail as follows below.

Appendix

Meter Definition

If the flow meter is intended for residential applications, it must be designed to meet the required standards. For example, per the INTERNATIONAL ORGANIZATION OF LEGAL METROLOGY (OIML), the metrological requirements of water meters are defined by the values of Q1, Q2, Q3 and Q4, which are described in Table 26.

TABLE 26

Flow-rate Zones per OIML

| FLOW-RATE ZONE | DESCRIPTION |
| --- | --- |
| Q1 | Lowest flow rate at which the meter is to operate within the maximum permissible errors. |
| Q2 | Flow rate between the permanent flow rate and the minimum flow rate that divides the flow rate range into two zones, the upper flow rate zone and the lower flow rate zone, each characterized by its own maximum permissible errors. |
| Q3 | Highest flow rate within the rated operating condition at which the meter is to operate within the maximum permissible errors. |
| Q4 | Highest flow rate at which the meter is to operate for a short period of time within the maximum permissible errors, while maintaining its metrological performance when it is subsequently operating within the rated operating conditions. |

A water meter is designated by the numerical value of 03 in $m^3/h$ and the ratio Q3/Q01. The value of 03 and the ratio of Q3/Q1 are selected from the lists provided in the OIML standards.

Water meters have to be designed and manufactured such that their errors do not exceed the maximum permissible errors (MPE) defined in the standards. For example, in OIML standards, water meters need to be designated as either accuracy class 1 or accuracy class 2, according to the requirements.

For class 1 water meters, the maximum permissible error in the upper flow rate zone (Q2≤Q≤Q4) is ±1%, for temperatures from 0.1° C. to 30° C., and ±2% for temperatures greater than 30° C. The maximum permissible error for the lower flow-rate zone (Q1≤Q≤Q2) is ±3%, regardless of the temperature range.

For class 2 water meters, the maximum permissible error for the upper flow rate zone (Q2≤Q≤Q4) is ±2%, for temperatures rom 0.1° C. to 30° C., and ±3% for temperatures greater than 30° C. The maximum permissible error for the lower flow rate zone (Q1≤Q≤Q2) is ±6% regardless of the temperature range.

The flow meter accuracy specified in the standards dictates the required accuracy in the electronics used for driving the ultrasonic transducers, circuits in the receiver path, and time measurement sub circuits. The stringent accuracy required at lower flow rates would require a very low noise signal chain in the transmitter and receiver circuits used in ultrasonic flow meters, as well as the ability to measure picosecond time intervals.

| Mathematical Calculations and Determination of Fluid Flow Rates Variables | |
|---|---|
| Q | Flow Rate (m³) or (gpm) |
| $Q_m$ | Measured Flow Rate from Reference Meter (gpm) |
| A | Cross Sectional Area of Flow Body (m²) |
| D | Diameter of Flow Body (m) |
| V | Velocity of Fluid (m/s) |
| $\Delta t$ | Raw Measurement Differential Time of Flight (s) |
| T | Temperature of Fluid |
| $C_f(T)$ | Characteristic Speed of Sound of Generic Fluid as a function of Fluid Temperature (m/s) |
| $C_w(T)$ | Characteristic Speed of Sound of Water as a function of Water Temperature (m/s) |
| L | Length Between Transducers Parallel to Flow (m) |
| K | Calibrated K Factor (m · s/min) |
| G | Gallons per Cubic Meter (264.172 gal/m³) |
| E(T) | Thermal Expansion Correction Factor as a function of Temperature |

Given the following equations for calculating Cross Sectional Area of a Flow Body, Velocity of Fluid, and Flow Rate:

$$A = \frac{D^2 \pi}{4} \quad (1)$$

$$V = \frac{\Delta t (C_f(T))^2}{2L} \quad (2)$$

$$Q = AV \quad (3)$$

Let $$K = \frac{D^2 \pi}{8L}$$

such that the calculation of Flow Rate can be expressed in terms of K, $\Delta t$, and $C_f(T)$:

$$Q = AV \quad (4)$$
$$= \frac{D^2 \pi}{4} \Delta t \frac{(C_f(T))^2}{2L}$$
$$= \frac{D^2 \pi}{8L} \Delta t (C_f(T))^2$$
$$= K \Delta t (C_f(T))^2$$

Inverse Kinematic Experimental Solution for K Factor from Calibration in Water:

$$K = \frac{Q_m}{(C_w(T))^2 \Delta t G} \quad (5)$$

Flow Rate Equation for Water Post Calibration:

$$Q = (C_w(T))^2 \Delta t K \quad (6)$$

(in gpm)

$$Q = (C_w(T))^2 \Delta t K G$$

1. In the ultrasonic calibration procedure flow diagram, because of the approach to calculating flow rate with a dynamic temperature feedback, automatically ad-justing the $C_f$ magnitude in the flow rate equation and $C_f$ encapsulating the temperature dependence of the measurement. (1) A single point (or multi point) calibration can be run agnostic to temperature of the fluid as long as the temper-ature is captured (2) while still yielding industry leading tolerances because the governing equations used for flow rate are a direct relation to the fundamental principles for acoustic propagation in fluids. (3) The novelty of this procedure is that a device can be calibrated with a single point (or multi point) calibration but hold tolerances full span, there is not polynomial fit or lookup table (based on flow measurements vs temperature), instead the acoustic propagation speed correction factors are held directly in the $C_f$, as the only dependence is tem-perature after the K factor encapsulates the Length and Diameter dependence of the equation.

Flow Rate Equation for Generic Fluid Post Water Calibration:

$$Q = (C_f(T))^2 \Delta t K \quad (7)$$

(in gpm)

$$Q = (C_f(T))^2 \Delta t K G$$

2. If a fluid change is known to have taken place, by design of the user, and the fluid is known. Rather than allowing the device to automatically create a shift in measurements based on the single point zero flow/known temperature measurements from the factory. (1) The user can instead input the new char-acteristic equation $C_f$, for the new fluid with a different $C_f$, and still maintain factory calibration for a new fluid. Assuming characteristic $C_f$ polynomial is known.

Flow Rate Equation for Generic Fluid corrected for Thermal Expansion post-initial calibration:

$$Q = (C_f(T))^2 \Delta t K E(T) \quad (8)$$

3. See FIG. 34. For a given flow body, a single point calibration can be ran to create the K factor associated with a DUT. Post initial calibration, a series of measurements can be taken at the same flow rate, referenced against a meter standard, over a range of temperatures. (1) By analysis of the deviation be-tween the measurements of the standard and the device under test, across the temperature range measured, a function can be generated to describe the characteristic thermal expansion of the flow body. (2) This function can be used in conjunction with the single point calibration (solved K factor), as a scalar to the flow rate, based on thermal expansion, which in conjunction with the K factor contains the dependence of length parallel flow between transducers and diameter of the flow body, for the governing equation for flow rate in ultrasonic flow metering. This function generated, can be tested across a series of iden-tically manufactured flow bodies to ensure the validity. When the validity of this function is ensured, each DUT, manufactured under the same conditions, can use this function in the calibration procedure without the need to regenerate the function for each flow body under test. (3) Meaning once this function is generated for one device, following devices that have a single point calibration, can use the adapted function to account for thermal expansion.

Other Claims

4. During the Calibration, a zero flow measurement is captured (see FIG. 25, Expressions 6,7,8). The measurements associated are absolute time of flight up stream and down stream (from the ultrasonic meter), as well at a high resolution temperature measurement of the fluid at that time. These measurements are logged to the device to be used as a way to test the fluid that the device is installed in during operation, with these parameters logged the device will be able to (1) test the fluid the device is installed compared the fluid it was calibrated/configured to measure by closing a valve and sampling zero flow absolute time of flight up stream and down stream, as well as temperature. These current measurements will be compared to the equivalent measurements taken during calibration. Both calibration and current zero flow measurements are tested by passing the values into a function that scales the time of flight measurements based on Temperature and the polynomial for $C_f$. This gives a fundamental reference to the expected absolute time of flight measurements at the current temperature of the fluid, based on the factory stored values. If there is deviation outside of the expected tolerance, (2) the device can acknowledge a fluid change as compared to the calibration fluid, the ramifications of fluid change are relevant to accuracy and process control feedback.

5. For fluids that share a similarly shaped $C_f$ curve and for a meter that has acknowledged a change in fluid (see ZF section of FIG. 25), (1) devices can automatically begin multiplying measurements by a ratiometric scalar in perceived measurements to recalculate measurements from the observed zero flow shift, based on the single point zero flow/known temperature measurements from the factory. In an attempt to mitigate errors in perceived flow rate versus actual flow rate, after a fluid or fluid concentration change.

6. When the meter is installed in an environment where not only flow rate is important but also the health of the plumbing system (see ZF section of FIG. 25), in terms of whether or not a leak exists in pumping or valving. The device will take a measurement at a regular interval of temperature and absolute TOF UPS/DNS, when the device perceives no flow or a rate below metering resolution. The Device will then compare this information with both the last know valve closure zero flow correlation and factory zero flow correlation. (1) This allows the device to check if the current perceived zero flow (with valve open) is above binned tolerance of fluid movement, disconnecting quantitative rate with qualitative movement. (2) Which allows for notification of leak conditions below the metering threshold, while maintaining no claims to meter at this binned threshold, allowing the meter "class/classification" to be maintained while giving feedback to user below the meter's resolution of flow. (3) Allowing for leak detection capabilities in a realm that previously, in this industry, only pressure drop tests could detect. (4) If the movement perceived is in a bin below the tolerance of certain movement, a valve is closed for a direct comparison of zero flow versus current perceived movement, as well as an optional cross correlation with pressure drop assessment from a high resolution pressure sensor measurement over time, with the valve closed.

We claim:
1. A high sensitivity ultrasonic flow meter, comprising:
a body forming a fluid pathway;
an upstream ultrasonic sensor disposed within said fluid pathway in an upstream position and emits an upstream ultrasonic signal into said fluid pathway;
a down-stream ultrasonic sensor disposed within said fluid pathway in a downstream position defining a distance between said upstream ultrasonic sensor and said down-stream ultrasonic sensor and emits a down-stream signal into said fluid pathway;
wherein said upstream ultrasonic sensor also detects said down-stream signal to determine a down-stream time-of-flight,
wherein said down-stream ultrasonic sensor also detects said upstream signal to determine an upstream time-of-flight, and
an ultrasonic microcontroller attached to said body that is capable of determining the fluid flow rate based on the upstream time-of-flight and down-stream time-of-flight,
wherein said high sensitivity ultrasonic flow meter is configured to dynamically recalculate a zero flow noise floor upon closure of a valve using a pressure drop test,
wherein said high sensitivity ultrasonic flow meter is configured to perform a single point calibration resulting in a calibrated factor,
wherein a characteristic polynomial is multiplied by said calibrated factor in determining fluid flow rate, thereby allowing for measurement of different fluids with similar characteristic polynomial curves.

2. The high sensitivity ultrasonic flow meter of claim 1 wherein said body is a pipe.

3. The high sensitivity ultrasonic flow meter of claim 2 wherein said pipe is further comprises of a proximal end and a distal end opposite of said proximal end at some predetermined distance.

4. The high sensitivity flow meter of claim 3 wherein said proximal end is threaded.

5. The high sensitivity flow meter of claim 4 wherein said distal end is threaded.

6. The high sensitivity flow meter of claim 1 wherein said upstream ultrasonic sensor and said down-stream ultrasonic sensor are located 62 mm apart from each other.

7. The high sensitivity flow meter of claim 1 wherein the entire meter is 130 mm long.

8. The high sensitivity flow meter of claim 1 wherein said upstream ultrasonic sensor and down-stream ultrasonic sensor are spaced a greater distance apart to form a "W-Mount".

9. The high sensitivity flow meter of claim 1 wherein said upstream ultrasonic sensor and said down-stream ultrasonic sensor are space some less distance apart to form a "V-Mount".

10. The high sensitivity flow meter of claim 2 wherein said downstream ultrasonic sensor is located on the opposite side of said pipe so that it forms a "Z-Mount" with said upstream ultrasonic sensor.

11. A high sensitivity flow meter comprising;
a pipe that forms a fluid pathway and further comprises a threaded proximal end and a threaded distal end;
an upstream ultrasonic sensor mounted to said pipe and positioned adjacent to said threaded proximal end;
a down-stream ultrasonic sensor mounted to said pipe and positioned opposite of said upstream ultrasonic sensor and adjacent to said distal end; and
an ultrasonic microcontroller mounted on said pipe and equidistant to said upstream ultrasonic sensor and said down-stream ultrasonic sensor, wherein said ultrasonic microcontroller is in constant communication with said upstream ultrasonic sensor and said downstream ultrasonic sensor, and wherein said high sensitivity flow meter is configured to perform a zero flow correlation routine during leak detection, said zero flow correlation routine occurring after a predetermined time without flow over a predetermined threshold, said zero flow correlation routine comprising the creation of a current flow signature by signal processing performed on a plurality of samples taken over a predetermined period of time.

12. The high sensitivity flow meter of claim 10 wherein said upstream ultrasonic sensor and said down-stream ultrasonic sensor are positioned at some distance apart to form a "W-Mount".

13. The high sensitivity flow meter of claim 10 wherein said upstream ultrasonic sensor and said down-stream ultrasonic sensor are spaced some distant apart to form a "V-Mount".

14. The high sensitivity flow meter of claim 10 wherein said down-stream ultrasonic sensor is mounted on the opposite side of said pipe such that a "Z-Mount" is formed in conjunction with said upstream ultrasonic sensor.

15. The high sensitivity flow meter of claim 10 wherein a pressure and temperature sensor is mounted to the top of said down-stream ultrasonic sensor.

16. The high sensitivity flow meter of claim 10 wherein said upstream ultrasonic sensor and said down-stream ultrasonic sensor are located 62 mm apart from each other.

17. The high sensitivity flow meter of claim 11 wherein the entire high sensitivity flow meter is 130 mm long.

18. The high sensitivity flow meter of claim 11, wherein said flow signature created by said zero flow correlation routine is compared with stored zero flow correlations, and when said flow signature is outside said stored zero flow correlations, game theory is used for interpolation of said stored zero flow correlations.

* * * * *